United States Patent
Toyoda

(10) Patent No.: US 10,437,488 B2
(45) Date of Patent: Oct. 8, 2019

(54) ELECTRONIC DEVICE AND NON-TRANSITORY COMPUTER READABLE STORAGE MEDIUM

(71) Applicant: KYOCERA Document Solutions Inc., Osaka (JP)

(72) Inventor: Takashi Toyoda, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/373,314

(22) Filed: Dec. 8, 2016

(65) Prior Publication Data

US 2017/0160964 A1 Jun. 8, 2017

(30) Foreign Application Priority Data

Dec. 8, 2015 (JP) .................................. 2015-239304

(51) Int. Cl.
G06F 3/06 (2006.01)

(52) U.S. Cl.
CPC ............ *G06F 3/0619* (2013.01); *G06F 3/065* (2013.01); *G06F 3/068* (2013.01); *G06F 3/0616* (2013.01); *G06F 3/0631* (2013.01); *G06F 3/0685* (2013.01)

(58) Field of Classification Search
CPC ............ G06F 3/00; G06F 3/06–3/0616; G06F 3/0617; G06F 3/0619–3/0631; G06F 3/0632–3/065; G06F 3/0652–3/068; G06F 3/0682–3/0685; G06F 3/0686–3/0689; G06F 9/00–9/548; G06F 11/00–11/3696; G06F 12/00–12/16;
(Continued)

(56) References Cited

U.S. PATENT DOCUMENTS

| | | | | |
|---|---|---|---|---|
| 7,124,272 B1 * | 10/2006 | Kennedy | ............... | G06F 3/0613 711/173 |
| 7,840,753 B1 * | 11/2010 | Booth | ................... | G06F 3/0611 711/113 |

(Continued)

FOREIGN PATENT DOCUMENTS

| | | |
|---|---|---|
| CN | 102841868 A | 12/2012 |
| JP | 2007-293440 A | 11/2007 |

(Continued)

OTHER PUBLICATIONS

Definition of symbolic link; MSDN; Apr. 10, 2014; retrieved from https://web.archive.org/web/20140410032418/https://msdn.microsoft.com/en-us/library/windows/desktop/aa365680(v=vs.85).aspx on Sep. 4, 2018 (Year: 2014).*

(Continued)

*Primary Examiner* — Daniel C. Chappell
(74) *Attorney, Agent, or Firm* — Hawaii Patent Services; Nathaniel K. Fedde; Kenton N. Fedde

(57) ABSTRACT

To provide an electronic device that is capable of maintaining a backup performance of a specified type of data for a long period of time. An MFP has a feature to includes a HDD, an SSD, a data type determination part that determines whether or not data is a specified type of data, a writing control part that controls a data writing, the writing control part writing the data that is determined to be the specified type of the data to both the HDD and the SSD, the writing control part writes the data that is determined not to be the specified type of the data to only the HDD, among the HDD and the SSD.

10 Claims, 17 Drawing Sheets

(58) Field of Classification Search
CPC .......................... G06F 13/00–13/4295; G06F 17/30–17/30997; G06F 2003/0691–2003/0698; G06F 2201/00–2201/885; G06F 2206/00–2206/20; G06F 2209/00–2209/549; G06F 2211/00–2211/902; G06F 2212/00–2212/7211; G06F 2213/00–2213/4004; G06F 2216/00–2216/17

See application file for complete search history.

(56) References Cited

U.S. PATENT DOCUMENTS

| | | | | |
|---|---|---|---|---|
| 8,275,965 | B2* | 9/2012 | Yamamoto | G06F 3/0616 711/103 |
| 8,700,853 | B2* | 4/2014 | Ikegaya | G06F 3/0608 711/113 |
| 9,268,701 | B1* | 2/2016 | Horn | G06F 12/0848 |
| 9,317,211 | B2* | 4/2016 | Samanta | G06F 3/0616 |
| 9,870,159 | B2* | 1/2018 | Cepulis | G06F 3/0616 |
| 2004/0193760 | A1* | 9/2004 | Matsunami | G06F 3/0608 710/36 |
| 2007/0250662 | A1* | 10/2007 | Yoshida | G06F 12/0866 711/113 |
| 2008/0005475 | A1* | 1/2008 | Lubbers | G06F 3/0613 711/118 |
| 2008/0229020 | A1* | 9/2008 | Plamondon | G06F 12/0813 711/122 |
| 2008/0288714 | A1* | 11/2008 | Salomon | G06F 3/0608 711/103 |
| 2009/0049234 | A1* | 2/2009 | Oh | G06F 12/0246 711/103 |
| 2009/0138654 | A1* | 5/2009 | Sutardja | G06F 12/0246 711/103 |
| 2009/0150593 | A1* | 6/2009 | Hamilton | G06F 3/061 711/101 |
| 2009/0157756 | A1* | 6/2009 | Sanvido | G06F 3/061 |
| 2010/0064111 | A1* | 3/2010 | Kunimatsu | G06F 12/08 711/161 |
| 2012/0117304 | A1* | 5/2012 | Worthington | G06F 12/0223 711/103 |
| 2012/0191900 | A1* | 7/2012 | Kunimatsu | G06F 12/0223 711/103 |
| 2012/0297113 | A1 | 11/2012 | Belluomini et al. | |
| 2012/0297197 | A1 | 11/2012 | Yale | |
| 2014/0098890 | A1 | 4/2014 | Sermadevi et al. | |
| 2014/0108705 | A1* | 4/2014 | Gorobets | G11C 16/3431 711/103 |
| 2014/0189203 | A1 | 7/2014 | Suzuki et al. | |
| 2014/0281819 | A1* | 9/2014 | Wood | G11C 16/349 714/773 |
| 2015/0058553 | A1* | 2/2015 | Wu | G06F 12/0873 711/113 |
| 2015/0186047 | A1* | 7/2015 | Shank | G06F 3/0655 711/103 |
| 2016/0162405 | A1* | 6/2016 | Horn | G06F 12/0848 711/102 |
| 2016/0196076 | A1* | 7/2016 | Oh | G06F 12/0246 711/103 |
| 2017/0337127 | A1* | 11/2017 | Sutardja | G06F 12/0246 |

FOREIGN PATENT DOCUMENTS

| | | |
|---|---|---|
| JP | 2011-515727 A | 5/2011 |
| JP | 2015-527623 A | 9/2015 |
| WO | 2009102425 A1 | 8/2009 |

OTHER PUBLICATIONS

PowerVault MD3 SSD Cache Overview; Dell Storage Engineering; Oct. 2015; retrieved from http://i.dell.com/sites/doccontent/shared-content/data-sheets/en/Documents/SSD_Cache_Overview.pdf on Dec. 29, 2018 (Year: 2015).*

Extending SSD Lifetime with Persistent In-Memory Metadata Management; Wei et al.; 2016 IEEE International Conference on Cluster Computing;Dec. 9-16, 2016 (Year: 2016).*

Office Action in Japan dated Jul. 4, 2018.

The first Office Action in China dated Sep. 4, 2018.

Japan Patent Office. Final Rejection of foreign counterpart, dated Feb. 6, 2019.

* cited by examiner

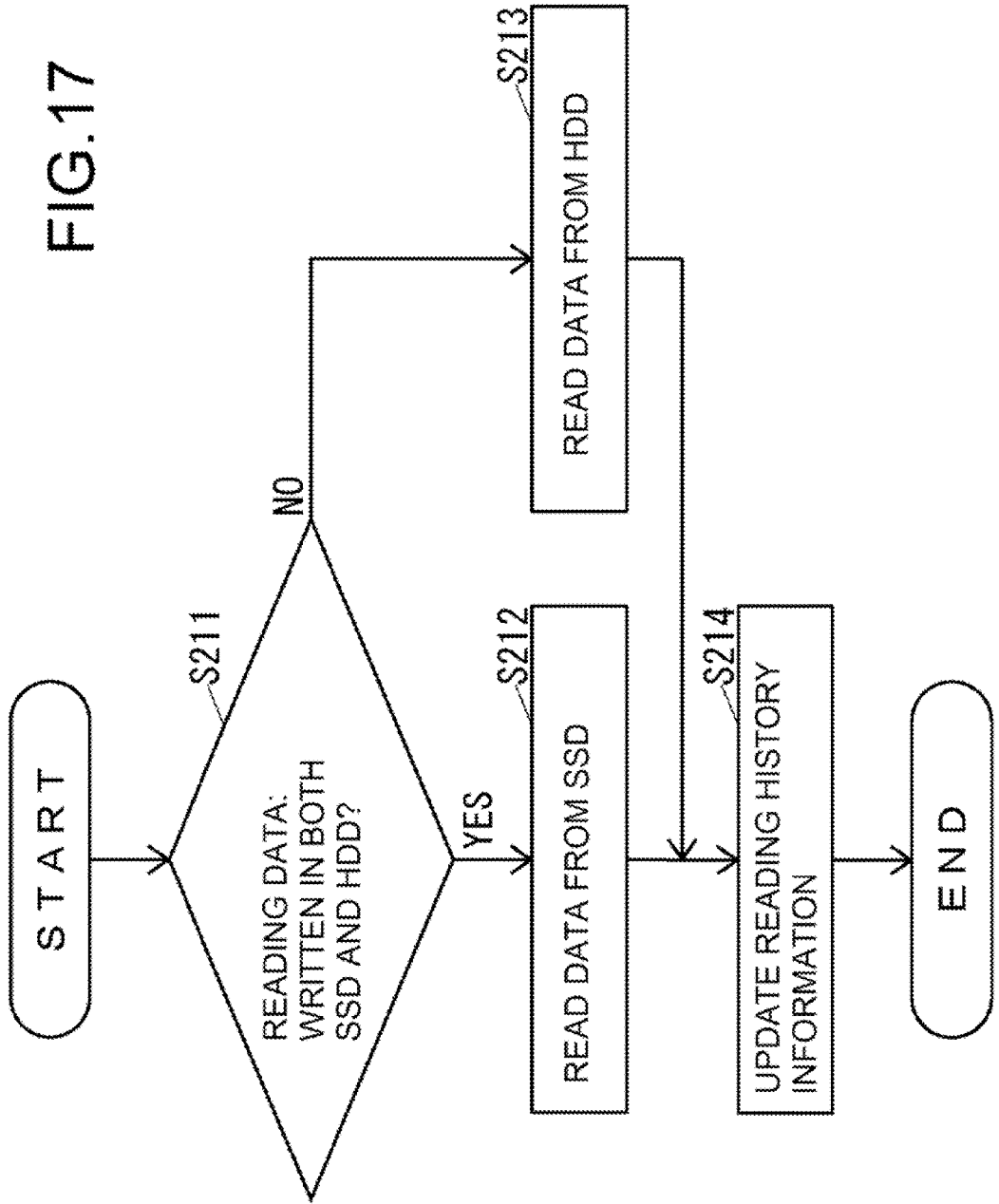

US 10,437,488 B2

ELECTRONIC DEVICE AND NON-TRANSITORY COMPUTER READABLE STORAGE MEDIUM

INCORPORATION BY REFERENCE

This application is based on and claims the benefit of priority from Japanese Patent Application No. 2015-239304 filed on Dec. 8, 2015, the contents of which are hereby incorporated by reference.

BACKGROUND

The present disclosure relates to an electronic device that has a hard disc drive and a semiconductor storage device, and a non-transitory computer-readable storage device.

An electronic device that has a hard disc drive and a semiconductor storage device is known both of which store data by order of an external instruction for important data back-up. The typical electronic device writes data on either one of the hard disc drive and the semiconductor storage device that is determined by a specific determination algorism if none of the hard disc drive and the semiconductor storage device are in receipt of an external writing instruction to both the hard disc drive and the semiconductor storage device.

SUMMARY

An electronic device according to the present disclosure includes a hard disk drive, a semiconductor storage device, a data type determination part that determines whether or not data is a specified type of data, and a writing control part that controls a data writing. The writing control part writes the data that is determined to be the specified type of the data by the data type determination part in both the hard disk drive and the semiconductor storage device. The writing control part writes the data that is determined not to be the specified type of the data by the data type determination part in only the hard disk drive selected from both the hard disk drive and the semiconductor storage device.

A non-transitory computer-readable storage medium according to the present disclosure stores a data access control program that is executable by a computer of an electronic device having a hard disk drive and a semiconductor storage device. The data access control program, when being executed by the computer, causes the computer to operate as a data type determination part that determines whether or not data is a specified type of data and a writing control part that controls a data writing. The writing control part writes the data that is determined to be the specified type of the data by the data type determination part in both the hard disk drive and the semiconductor storage device. The writing control part writes the data that is determined not to be the specified type of the data by the data type determination part in only the hard disk drive selected from both the hard disk drive and the solid state drive.

BRIEF DESCRIPTION OF THE DRAWINGS

FIG. 17 illustrates steps of a data reading operation of the MFP, illustrated in FIG. 1, on which the HDD is mounted.

DETAILED DESCRIPTION

Hereinbelow, a description is made, with reference to the attached drawings, as to an exemplary embodiment of the present disclosure.

First of all, a description is made as to a configuration of an MFP (Multifunction Peripheral) as an electronic device according to an exemplary embodiment.

Figure 1:
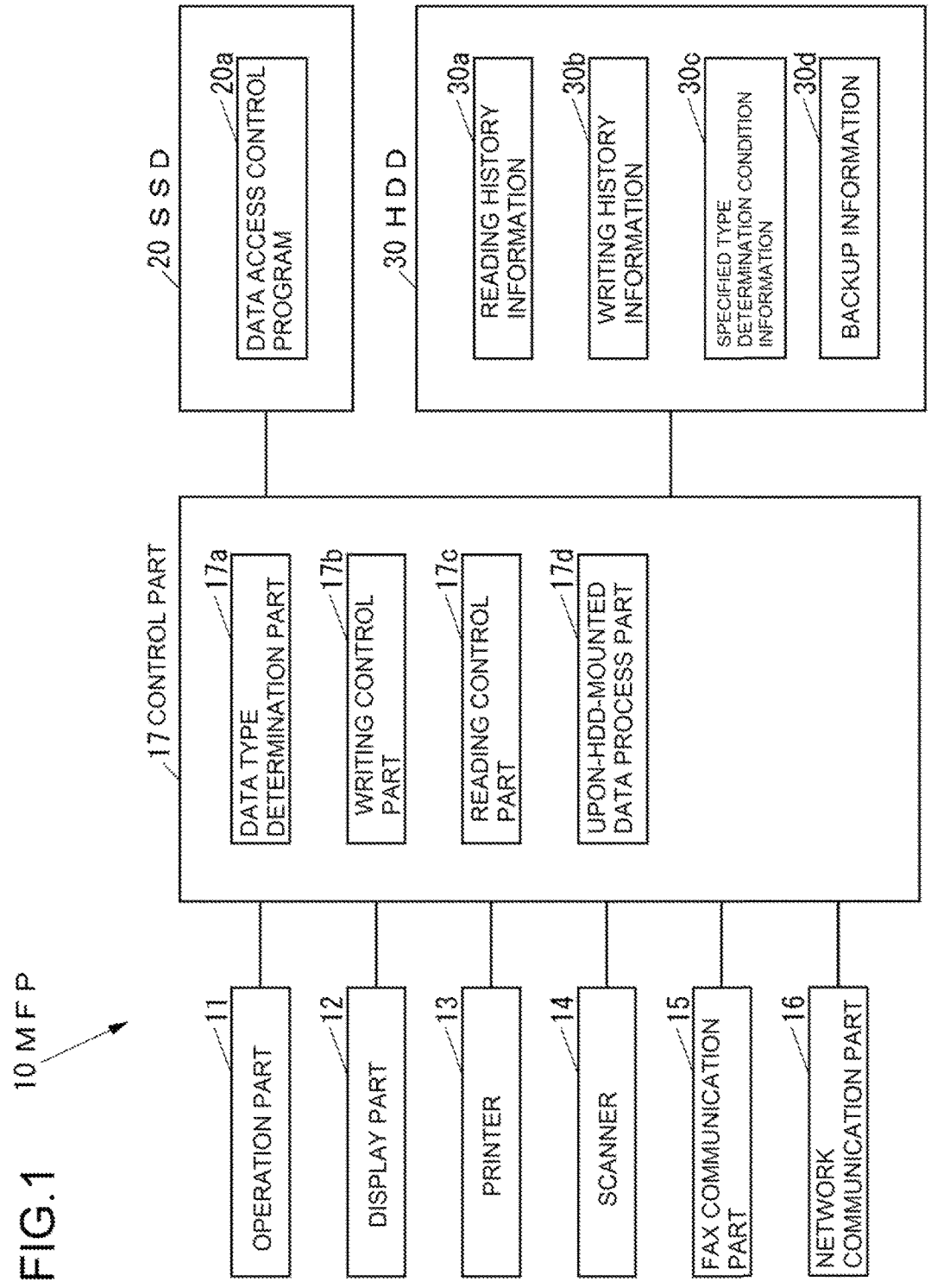
FIG. 1 illustrates a schematic configuration of an MFP according to an exemplary embodiment of the present disclosure.

FIG. 1 illustrates a configuration of an MFP 10 according to the exemplary embodiment.

As illustrated in FIG. 1, the MFP 10 includes an operation part 11 is an input device including buttons for receiving various inputs, a display part 12 that is a display device such as an LCD (Liquid Crystal Display) for displaying various information, a printer 13 that is a printing device for executing a print operation on a recording medium such as a sheet of paper, a scanner 14 that is a reading device for reading an image from a manuscript, a FAX communication part 15 that is a FAX device for performing a facsimile communication with an external facsimile device via a communication line such as a public telephone line, a network communication part 16 that is a network communication device for performing a communication with an external device via a network such as a LAN (Local Area Network), a control part 17 that performs the whole control of the MFP 10, an SSD (Solid State Drive) 20 as a semiconductor storage device that stores various data, and a HDD (Hard Disc Drive) 30.

As compared to the HDD 30, semiconductor storage devices including the SSD 20 have advantages of low power consumption and high data writing speed. On the other hand, as compared to the HDD 30, the semiconductor storage device is expensive per unit capacity and therefore is not suitable for the storage of large capacity data. In the present exemplary embodiment, the semiconductor storage device is explained as the SSD 20, however, other semiconductor storage devices such as a memory card and the like are available other than the SSD.

The SSD 20 stores a data access control program 20*a* for controlling data access to the MFP 10. The data access control program 20*a* may be installed into the MFP 10 at its production stage, installed into the MFP 10 in an additional manner from an external storage medium such as an SD card, a USB (Universal Serial Buses) memory and the like, or installed into the MFP 10 in an additional manner from on a network.

As compared to the semiconductor storage device such as the SSD 20, the HDD 30 has an advantage of being inexpensive per unit capacity and is suitable for the storage of large capacity data. On the other hand, the HDD 30 is inferior to the semiconductor storage device in low power consumption and high data writing speed.

The HDD 30 is capable of storing the reading history information 30*a* that indicates a history of time when data is read for each data. Here, a data reading frequency may be calculated based on the history of the read time indicated by the reading history information 30*a*. For example, the data reading frequency is indicated the number of readings in a specified duration of time. As an example of the data reading frequency, a reading frequency of an address note will be increased whenever information within the address note is accessed.

The HDD 30 is capable of storing writing history information 30*b* that is indicative of a history of time when data is written for each data. Here, a data write frequency may be calculated based on the history of the written time indicated by the writing history information 30*b*. For example, the data writing frequency is indicated the number of writings in a specified duration of time. As an example of the data writing frequency, a writing frequency of the address note will be increased whenever information within the address note is added, deleted, or changed.

The HDD 30 is capable of storing a specified type determination condition information 30*c* that is indicative of a condition that is designated by a user in order for the MFP 10 to determine that data is a specified type of data. The condition indicated by the specified type determination condition information 30*c* may be a specific transmission source such as a specific person. In addition, the condition indicated by the specified type determination condition information 30*c* may be that a storage designation for data in the HDD 30 is a specific storage designation such as a specific holder. Further, the condition indicated by the specified type determination condition information 30*c* may be that the specified type of data is one which is designated directly by a user. Moreover, it may be possible to combine the plural conditions indicated by the specified type determination condition information 30*c*. Still further, the condition indicated by the specified type determination condition information 30*c* may be inputted via, for example, the operation part 11.

The HDD 30 is capable of storing backup information 30*d* that is indicative of identification information of backed up data.

The control part 17 includes, for example, a CPU (Central Processing Unit), a ROM (Read Only Memory) that stores programs and various types of data, and a RAM (Random Access Memory) to be used as a working region of the CPU. The CPU executes the programs stored in the SSD 20 or the ROM.

The control part 17, when executes the data access control program 20*a* stored in the SSD 20, acts as a data type determination part 17*a* for determining whether or not data is a specified type of data, a writing control part 17*b* for controlling a data writing, a reading control part 17*c* for controlling a data reading, and an upon-HDD-mounting data process part 17*d* for performing a data processing when the HDD 30 is mounted in an additional manner.

Figure 2:
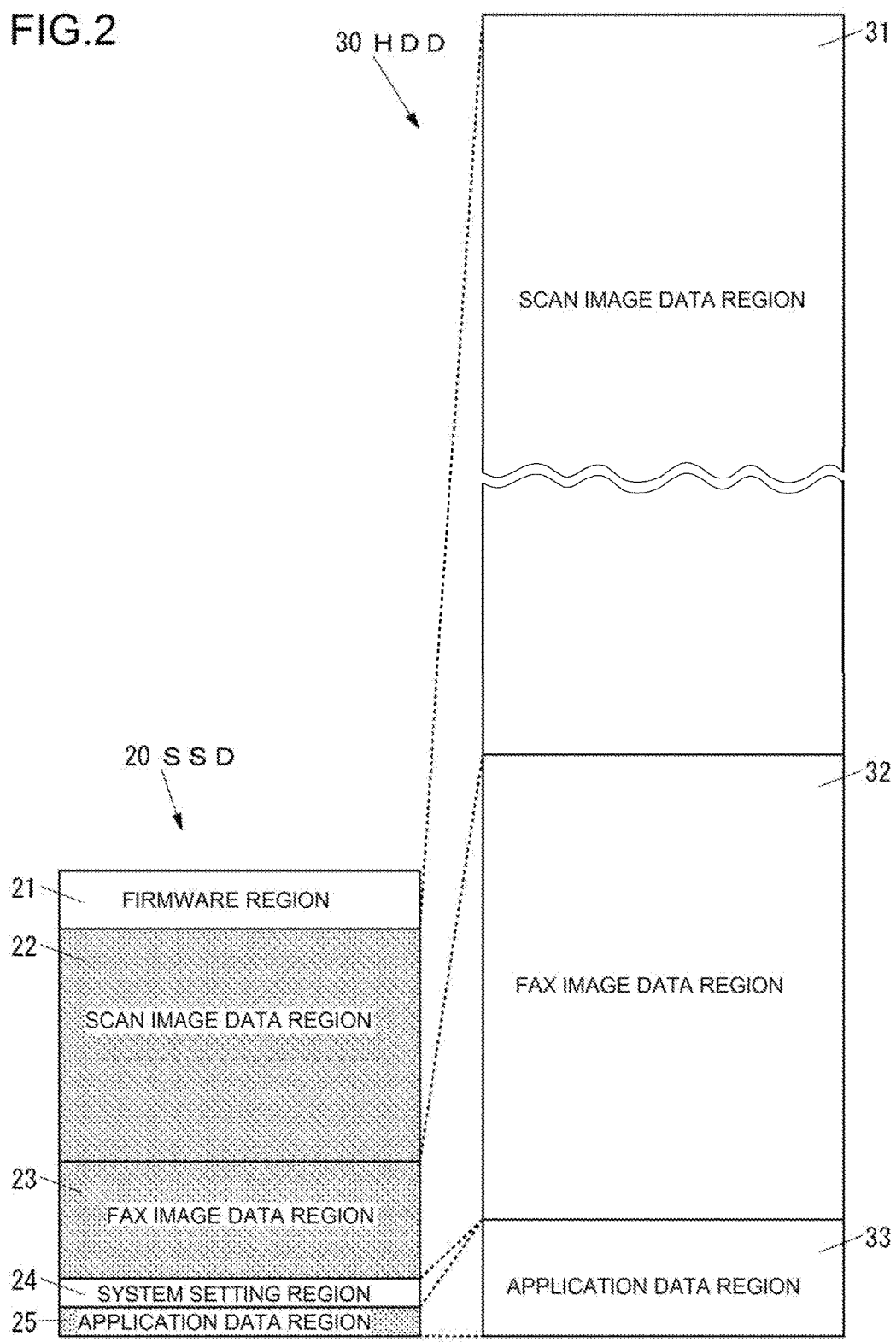
FIG. 2 illustrates partition configurations of an SSD and a HDD illustrated in FIG. 1.

FIG. 2 illustrates exemplary partition configurations of the respective SSD 20 and HDD 30.

As illustrated in FIG. 2, the SSD 20 includes a firmware region 21 for storing a firmware of the MFP 10, a scan image data region 22 for storing image data created from an image of a manuscript read by the scanner 14, a FAX image region 23 for storing image data that is transmitted or received via the FAX communication part 15, a system setting region 24 for storing settings of a copy function of the MFP 10, a facsimile function of the MFP 10, and a system of the MFP 10, application data region 25 for storing data of various applications (hereinafter, which will be referred to as "application data") that are installed in the MFP 10. Sizes of the firmware region 21, the scan image data region 22, the FAX image region 23, the system setting region 24, and the application data region 25 are, for example, 1 GByte, 4 GByte, 2 GByte, 0.5 GByte, and 0.5 GByte, respectively.

It is to be note that the SSD 20 may include another region other than the firmware region 21, the scan image data region 22, the FAX image data region 23, the system setting region 24, and the application data region 25.

The HDD 30 includes a scan image data region 31 for storing image data created from an image of a manuscript read by the scanner 14, a FAX image region 32 for storing image data that is transmitted or received via the FAX communication part 15, an application data region 33 for storing data of various applications that are installed in the MFP 10. Sizes of the scan image data region 31, the FAX image region 32, and the application data region 33 are, for example, 240 GByte, 8 GByte, and 2 GByte, respectively.

It is to be noted that the HDD 30 may be possible to include another region other than the scan image data region 31, the FAX image region 32, and the application data region 33.

In FIG. 2, the scan image data region 22 of the SSD 20 is for the backup copy of at least part of the data of the scan image data region 31 of the HDD 30. The FAX image data region 23 of the SSD 20 is for the backup copy of at least part of the data of the FAX image data region 32 of the HDD 30. The application data region 25 of the SSD 20 is for the backup copy of at least part of the data of the application data region 33.

It is to be noted that the HDD 30 is a device that is capable of being optionally mounted on the MFP 10 in an additional manner. Thus, the MFP 10 is capable of being executed, even if the HDD 30 (refer to FIG. 1) is not mounted on the MFP 10 as shown in FIG. 3, and at an initial condition of the MFP 10, as shown in FIG. 3, the HDD 30 is not mounted on the MFP 10.

Figure 4:
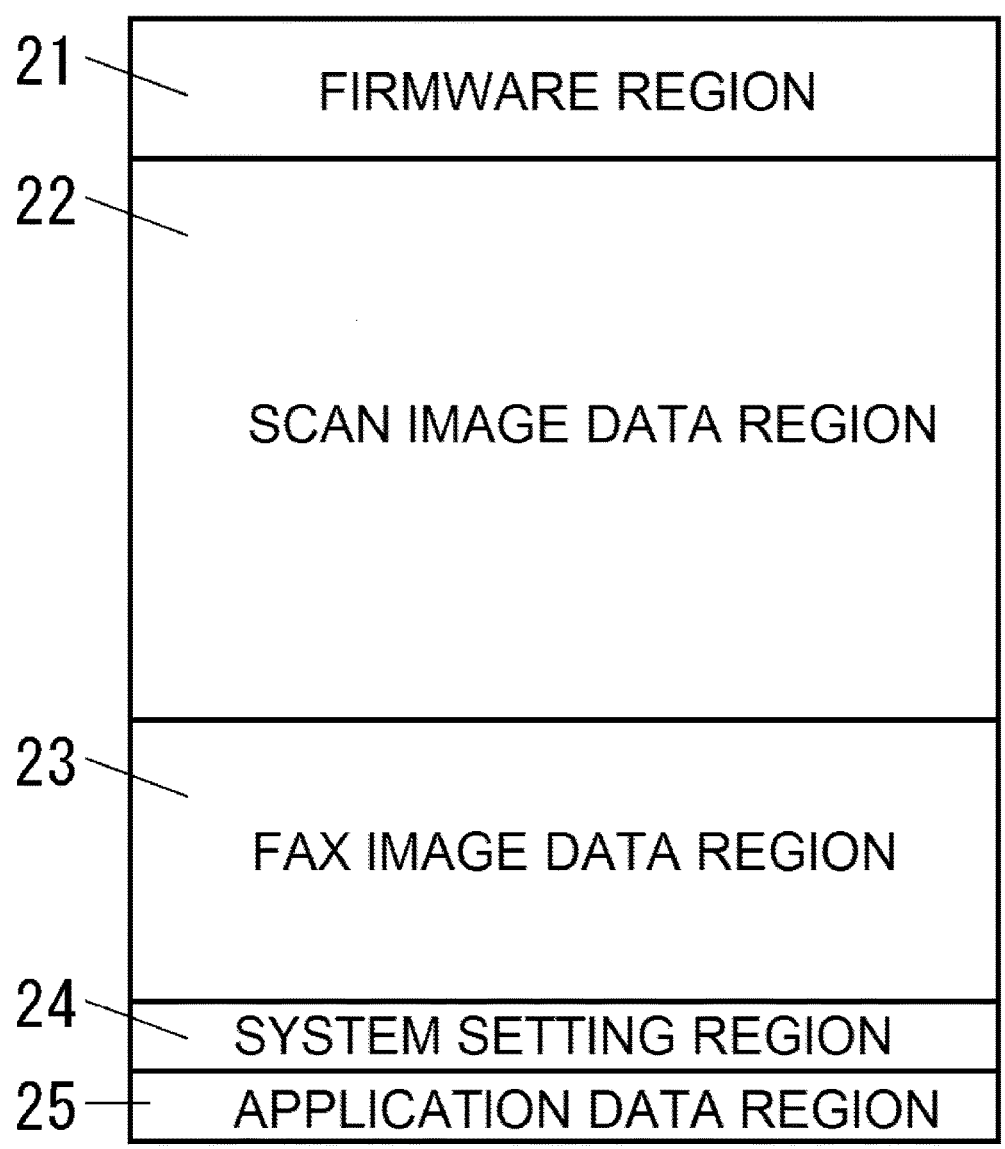
FIG. 4 illustrates an example of a partition configuration of an SSD illustrated in FIG. 3.

The partition configuration of the SSD 20 when the HDD 30 is not mounted on the MFP 10 is illustrated, for example, in FIG. 4. Unlike the condition shown in FIG. 2, the scan image data region 22, the FAX image data region 23, and the application data region 25 of the SSD 20 that are illustrated in FIG. 4 are not regions for the purpose of taking backup copy.

Next, an operation of the MFP 10 is described.

Figure 3:
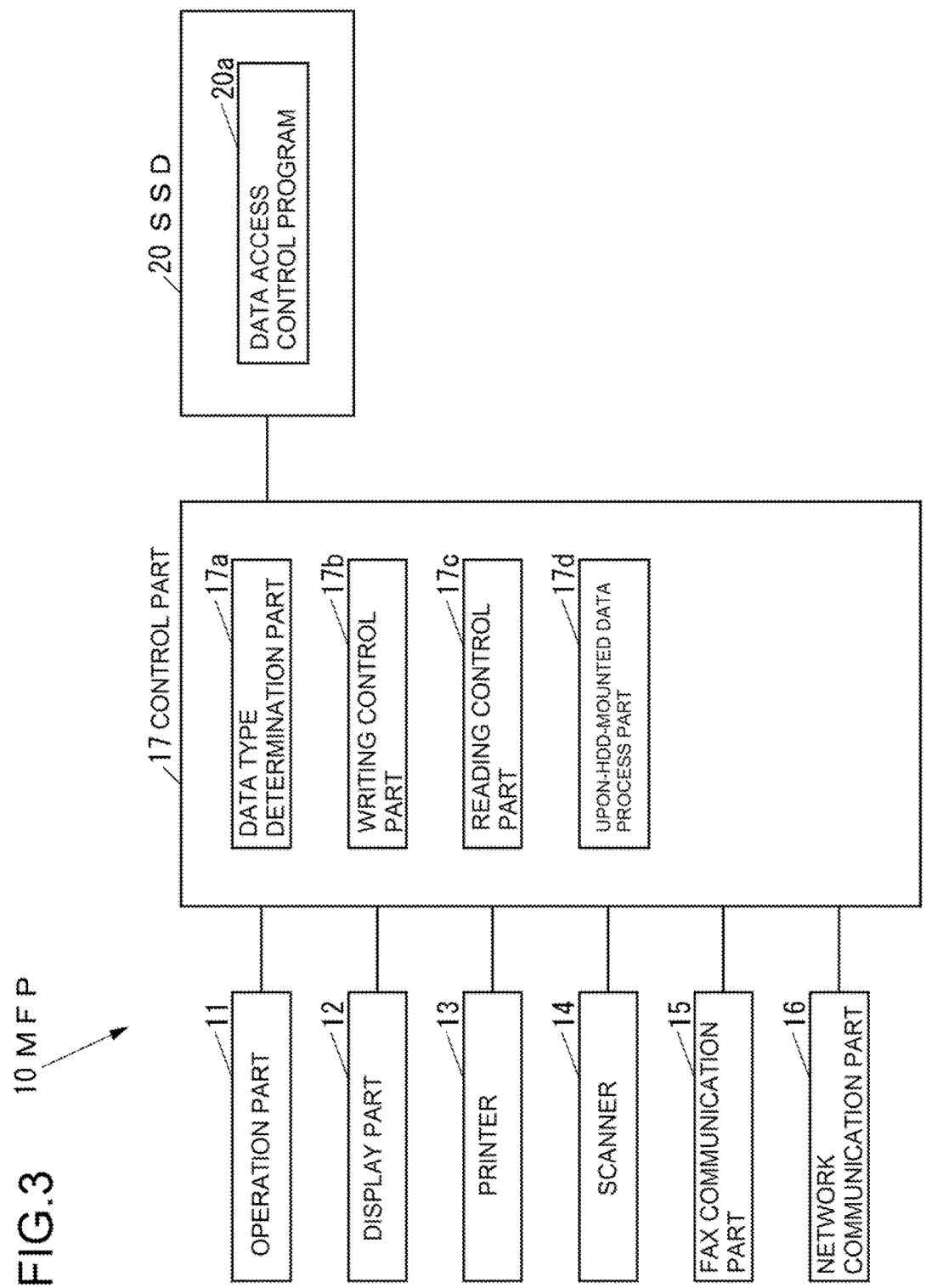
FIG. 3 illustrates a schematic configuration of the MFP illustrated in FIG. 1 on which no HDD is mounted.

First of all, a description is made as to a data writing operation of the MFP 10 on which the HDD 30 is not mounted as illustrated in FIG. 3.

Figure 5:
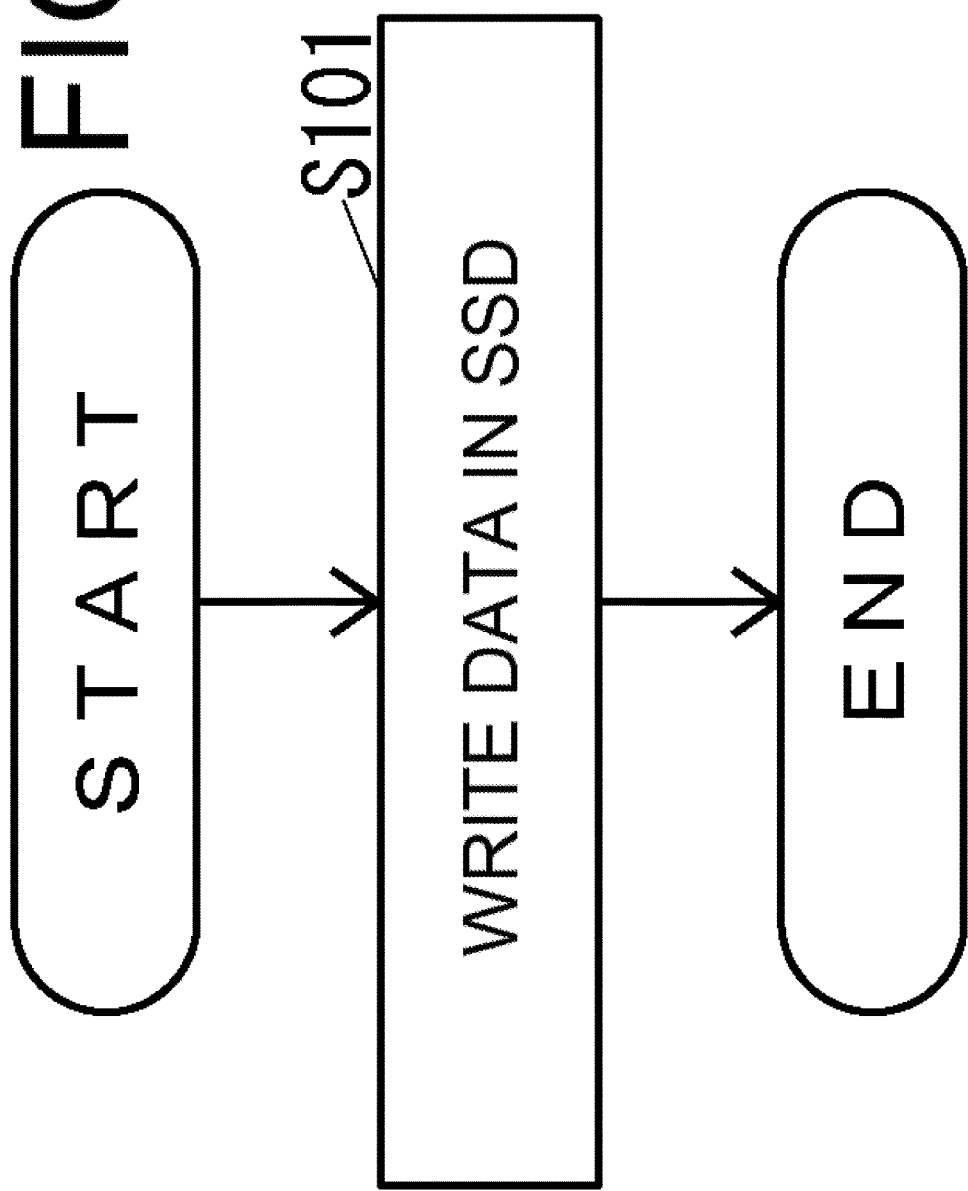
FIG. 5 illustrates steps of a data writing operation of the MFP, illustrated in FIG. 1, on which no HDD is mounted.

FIG. 5 illustrates steps of the data writing operation of the MFP 10 on which the HDD 30 is not mounted.

As illustrated in FIG. 5, the writing control part 17b writes data to the SSD 20 (S101) and then terminates the operation shown in FIG. 5. More specifically, the writing control part 17b writes data to either one of the scan image data region 22, the FAX image data region 23, the system setting region 24, and the application data region 25, depending on data type.

Next, a description is made as to a data reading operation of the MFP 10 on which the HDD 30 is not mounted as illustrated in FIG. 3.

Figure 6:
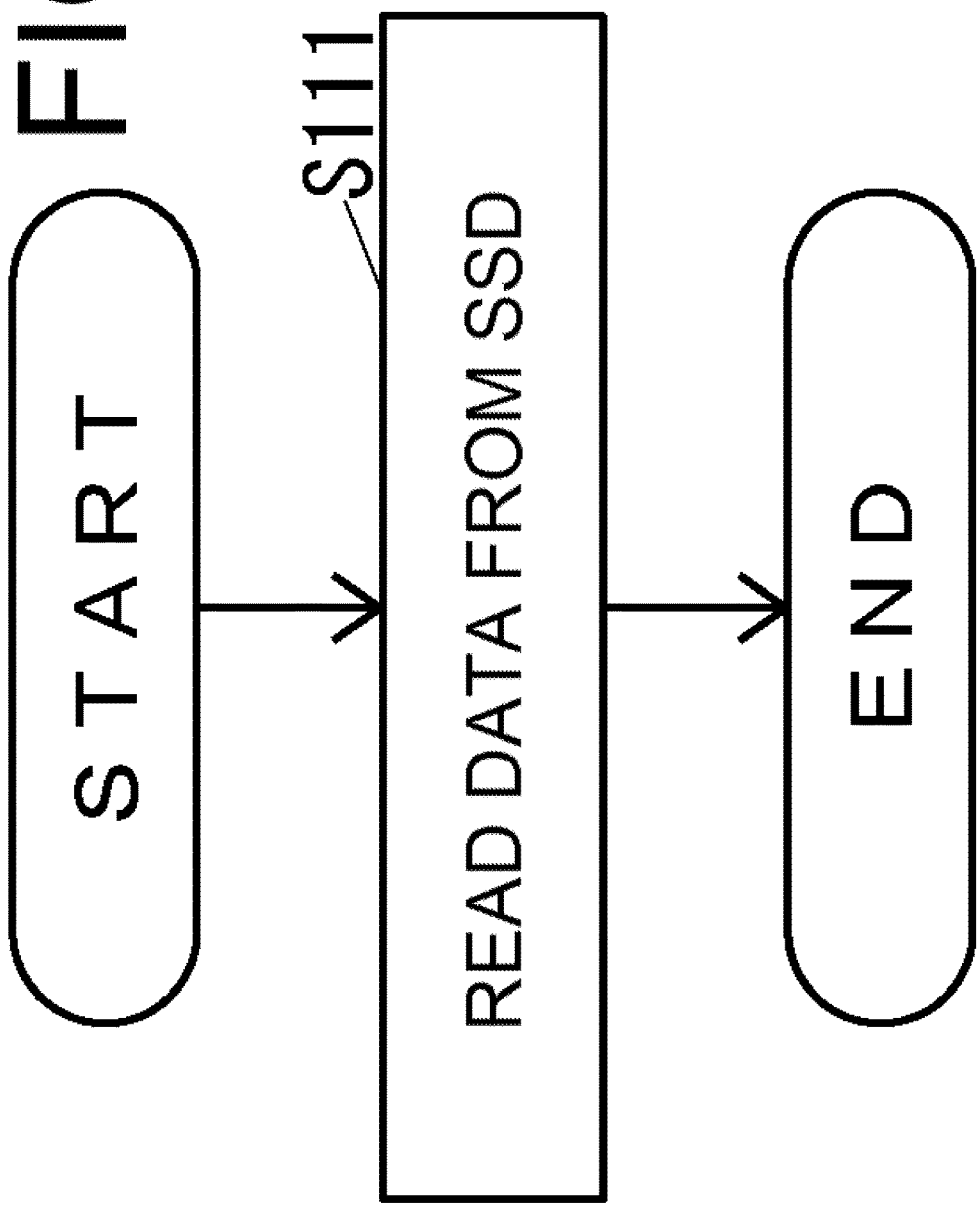
FIG. 6 illustrates steps of a data reading operation of the MFP, illustrated in FIG. 1, on which no HDD is mounted.

FIG. 6 illustrates steps of the data reading operation of the MFP 10 on which the HDD 30 is not mounted.

As illustrated in FIG. 6, the reading control part 17c reads data from the SSD 20 (S111) and then terminates the operation shown in FIG. 6. More specifically, the reading control part 17c reads data from either one of the scan image data region 22, the FAX image data region 23, the system setting region 24, and the application data region 25, depending on data type.

Next, a description is made as to an operation of the MFP 10 in a case of mounting the HDD 30 on the MFP 10.

Figure 7:
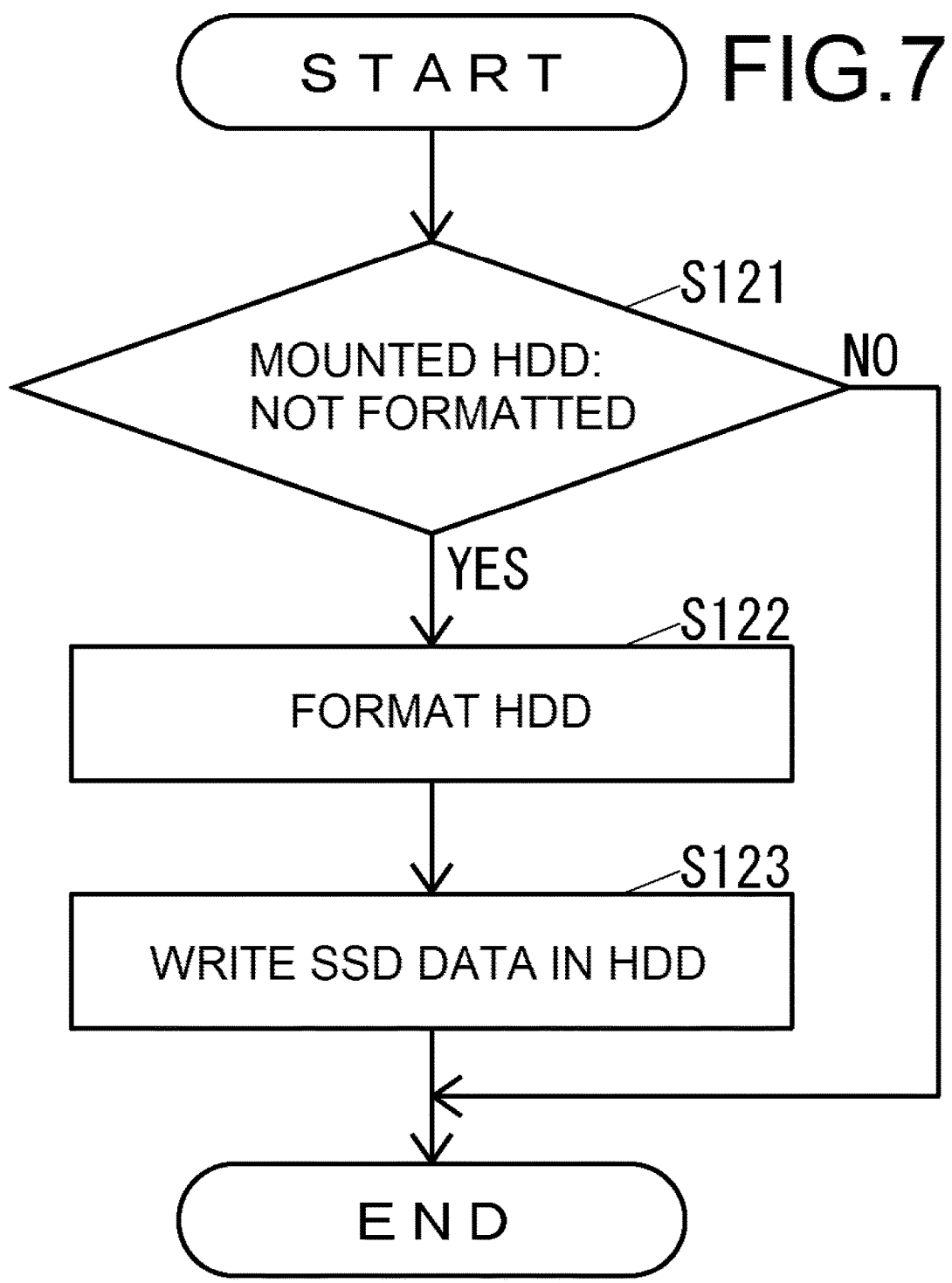
FIG. 7 illustrates steps of an operation of the MFP, illustrated in FIG. 1, on which the HDD is mounted.

FIG. 7 illustrates steps of the operation of the MFP 10 in a case of mounting the HDD 30 on the MFP 10.

AS illustrated in FIG. 7, the upon-HDD-mounting data process part 17d determines whether or not the mounted HDD 30 is an unformatted HDD (S121).

Figure 8:
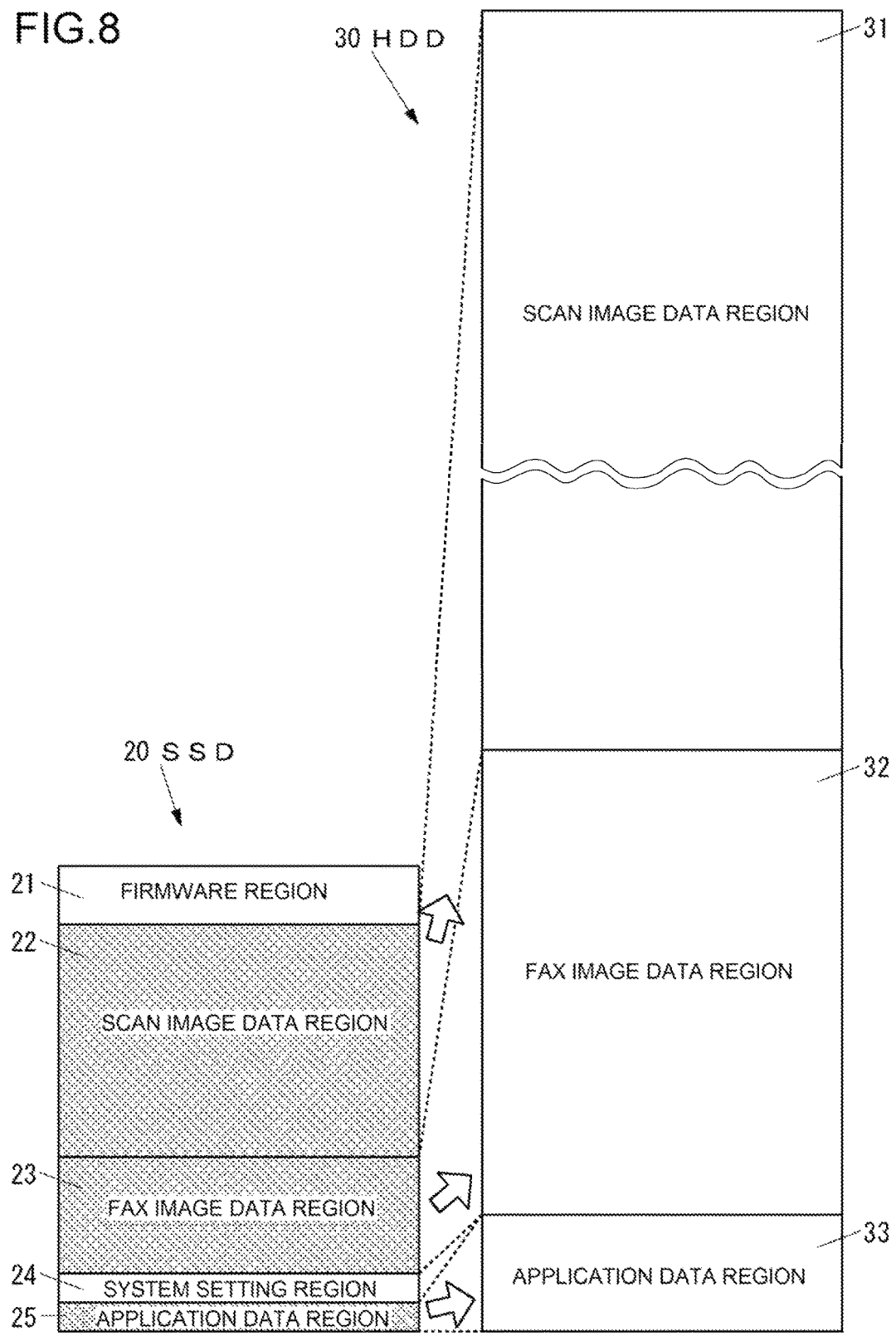
FIG. 8 illustrates exemplary partition configurations of the SSD and the HDD illustrated in FIG. 1 while data read from the SSD is writing in the HDD.

If the upon-HDD-mounting data process part 17d determines, at S121, that the HDD 30 is an unformatted HDD, the upon-HDD-mounting data process part 17d formats the HDD 30 to establish a partition configuration of the HDD 30 to be in coincidence with the partition configuration illustrated in FIG. 2 (S122). Then, as illustrated in FIG. 8, the upon-HDD-mounting data process part 17d causes the reading control part 17c to read data from the scan image data region 22, the FAX image data region 23, and the application data region 25 of the SSD 20 and causes the writing control part 17b to write the resulting data, to the scan image data region 31, the FAX image data region 32, and the application data region 33 of the HDD 30 (S123), respectively, and terminates the job illustrated in FIG. 7.

On the other hand, if the upon-HDD-mounting data process part 17d determines, at S121, that the HDD 30 is not an unformatted HDD, the upon-HDD-mounting data process part 17d terminates the process illustrated in FIG. 7 without executing the processes of S122 and S123.

It is to be noted that the data in the scan image data region 22, the FAX image data region 23, and the application data region 25 of the SSD 20 may be deleted from the scan image data region 22, the FAX image data region 23, and the application data region 25 after execution of the process of S123. In addition, the data in the scan image data region 22, the FAX image data region 23, and the application data region 25 of the SSD 20 may be kept, even after execution of the process of S123, as back up data for the scan image data region 31, the FAX image data region 32, and the application data region 33 of the HDD 30. If the data in the scan image data region 22, the FAX image data region 23, and the application data region 25 of the SSD 20 is left as back up data, the upon-HDD-mounting data process part 17d adds identification information of the data to backup information 30d.

In MFP10, mounting the HDD 30 of large storage capacity causes the storage region that is available for the user to increase in a drastic manner.

Next, a description is made as to a data writing operation of the MFP 10 on which the HDD 30 is mounted as illustrated in FIG. 1.

Figure 9:
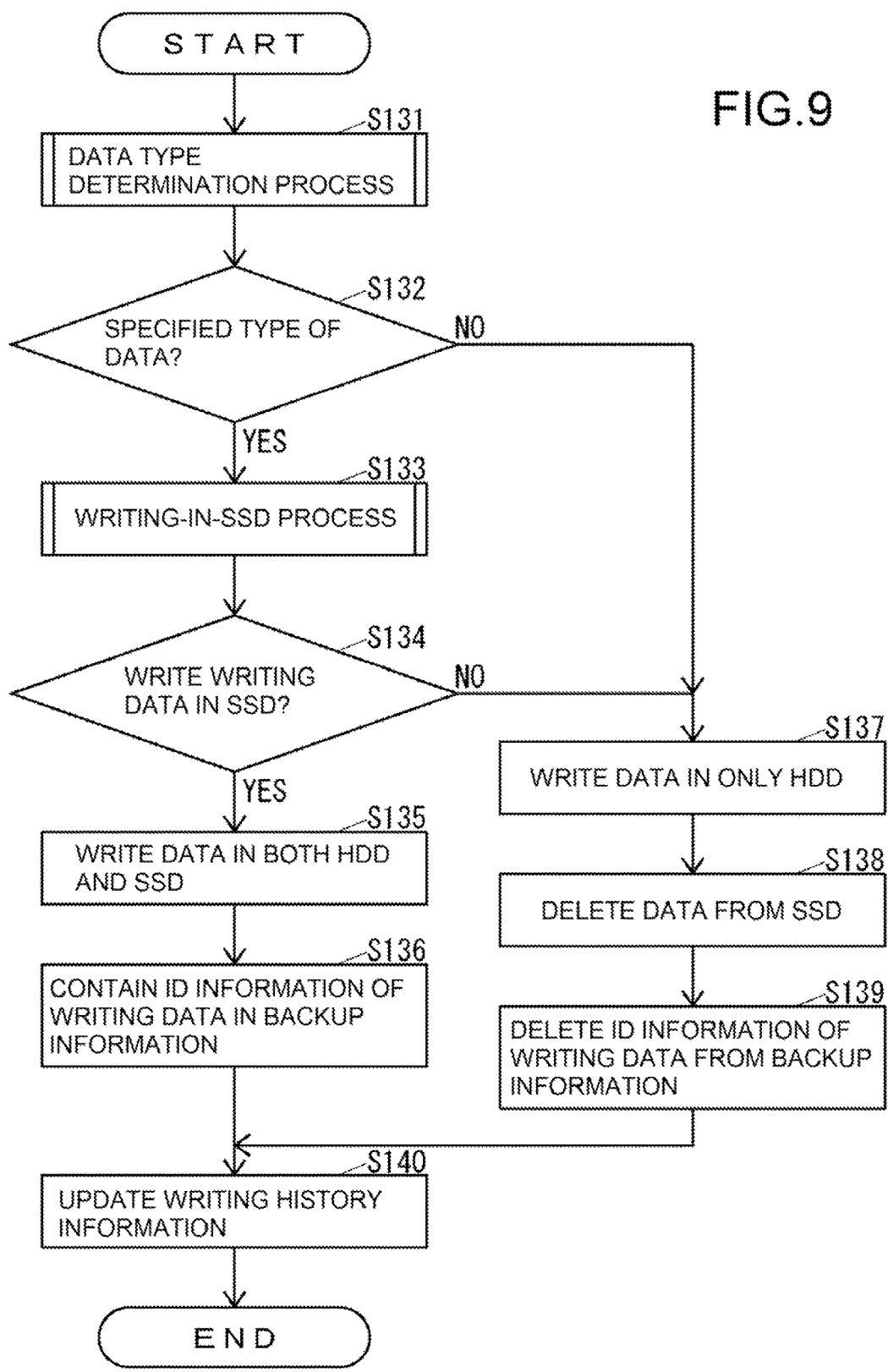
FIG. 9 illustrates steps of a data writing operation of the MFP, illustrated in FIG. 1, on which the HDD is mounted.

FIG. 9 illustrates steps of the data writing operation of the MFP 10 on which the HDD 30 is mounted.

As illustrated in FIG. 9, the data type determination part 17a executes a data type determination process for the determination of a type of data that is a writing data (which will be referred to as "writing data") (S131).

Figure 10:
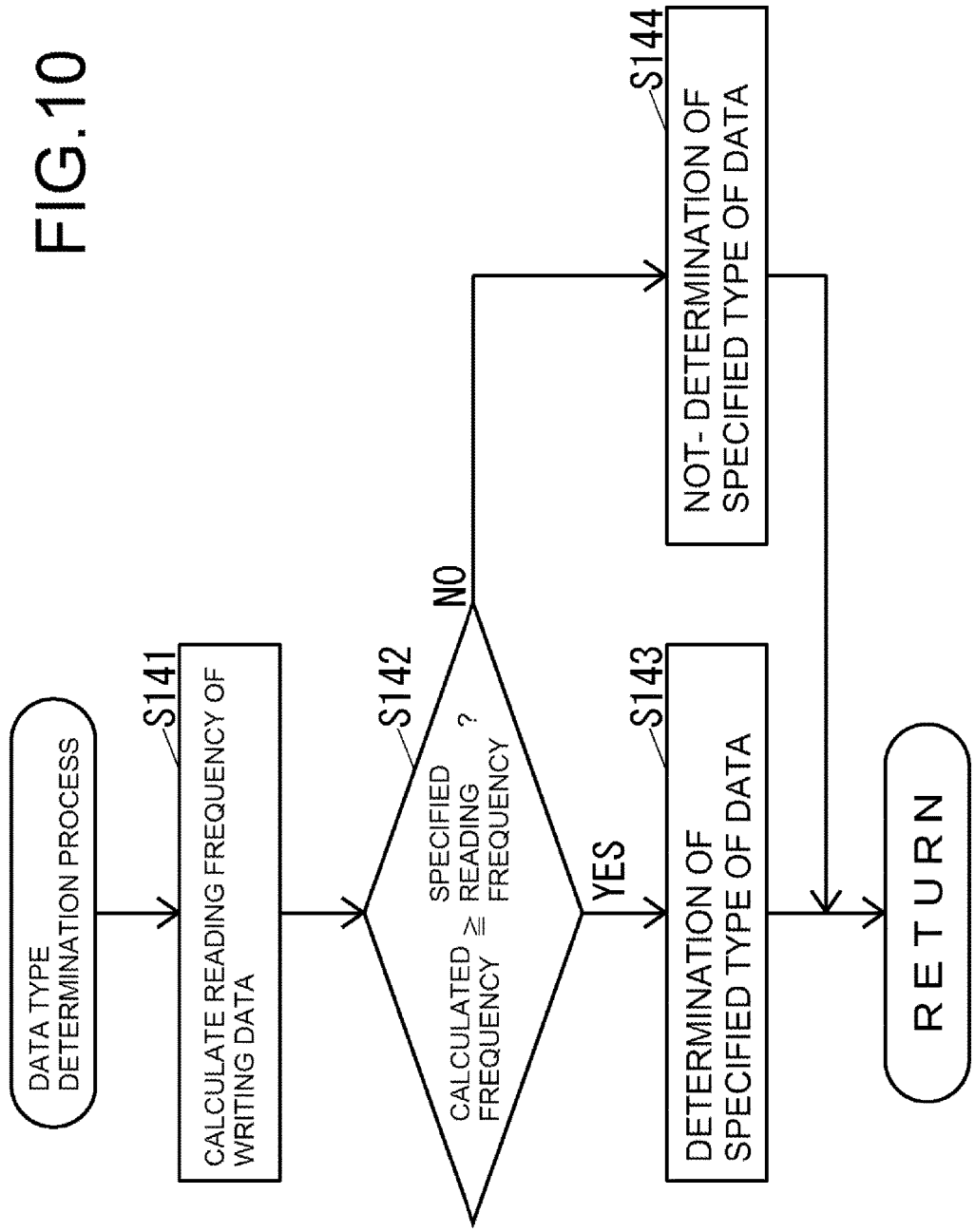
FIG. 10 illustrates an example of data type determination process illustrated in FIG. 9.

FIG. 10 illustrates an example of data type determination process illustrated in FIG. 9.

As illustrated in FIG. 10, the data type determination part 17a calculate a reading frequency of the writing data based on reading history information 30a (S141).

Next, the data type determination part 17a determines whether or not the reading frequency calculated in S141 is greater than or equal to a specific reading frequency (S142).

If the data type determination part 17a determines, at S142, that the reading frequency calculated in S141 is greater than or equal to the specific reading frequency, the data type determination part 17a determines that the writing data is the specified type of data (S143) and terminates the data type determination process illustrated in FIG. 10.

On the other hand, if the data type determination part 17a determines, at S142, that the reading frequency calculated in S141 is less than the specific reading frequency, the data type determination part 17a determines that the writing data is not the specified type of data (S144) and terminates the data type determination process illustrated in FIG. 10.

Another example of the data type determination process illustrated in FIG. 9 is available other than the data type determination process illustrated in FIG. 10. For example, the data type determination process illustrated in FIG. 9 may be embodied in the data type determination process illustrated in FIG. 11.

Figure 11:
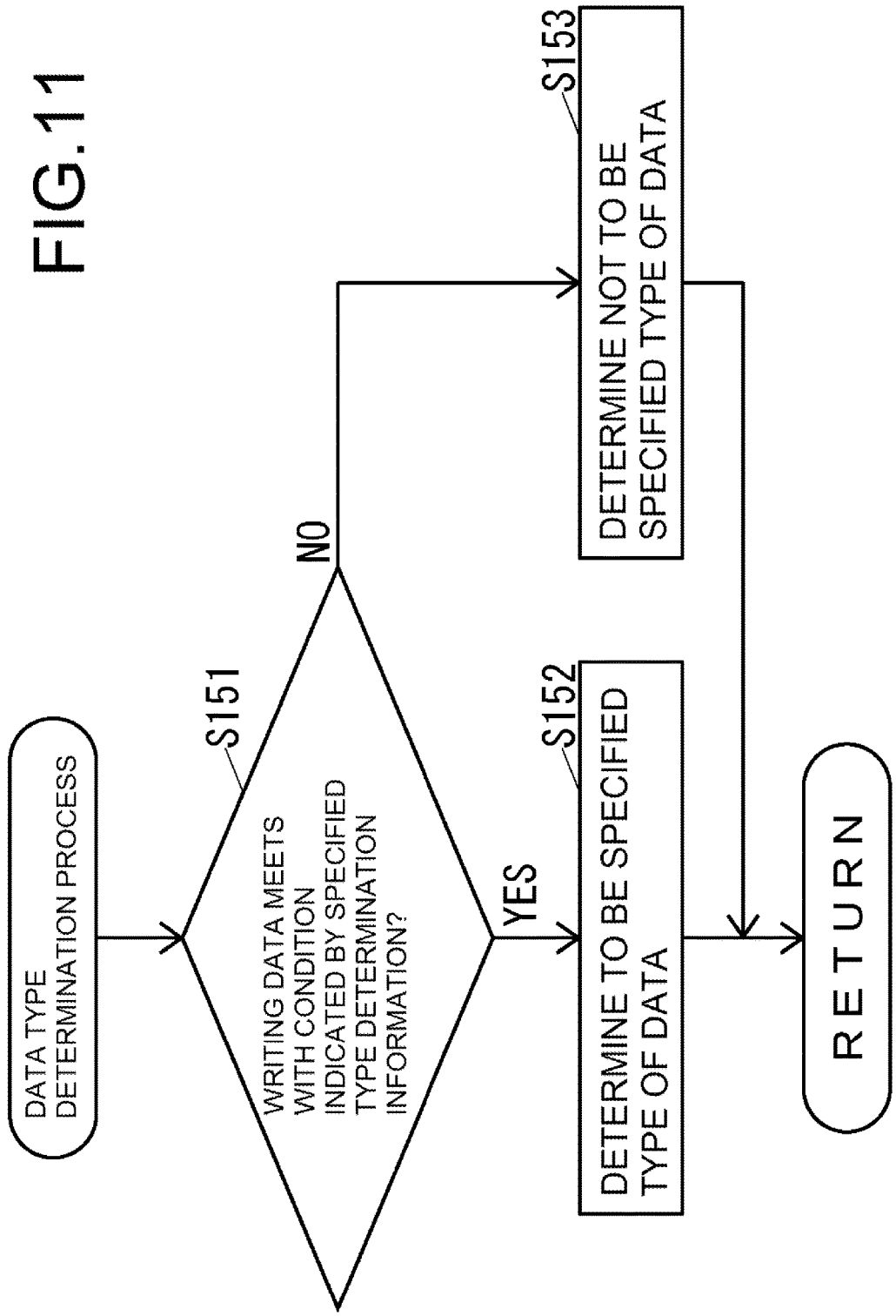
FIG. 11 illustrates another example, which is different from the example illustrated in FIG. 10, of the data type determination process illustrated in FIG. 9.

As illustrated in FIG. 11, the data type determination part 17a determines whether or not writing data meets with a condition indicated by the specified type determination information 30c (S151).

If the data type determination part 17a determines, at S151, that the writing data meets with the condition indicated by the specified type determination information 30c, the data type determination part 17a determines that the writing data is the specified type of data (S152) and terminates the data type determination process illustrated in FIG. 11.

On the other hand, if the data type determination part 17a determines, at S151, that the writing data does not meet with the condition indicated by the specified type determination information 30c, the data type determination part 17a determines that the writing data is not the specified type of data (S153) and terminates the data type determination process illustrated in FIG. 11.

The data type determination process illustrated in FIG. 9 may be formed by combining the data type determination process illustrated in FIG. 10 and the data type determination process illustrated in FIG. 11. More specifically, the data type determination part 17a is allowed to determine that the writing data is the specified type of data either when the reading frequency of the writing data is greater than or equal to the specified reading frequency or when the writing data meets with the condition indicated by the specified type determination information 30c.

The data type determination process illustrated in FIG. 9 may be embodied in any process other than the aforementioned plural data type determination processes. For example, the data type determination process illustrated in FIG. 9 may be embodied in a data type determination process as illustrated in FIG. 12.

Figure 12:
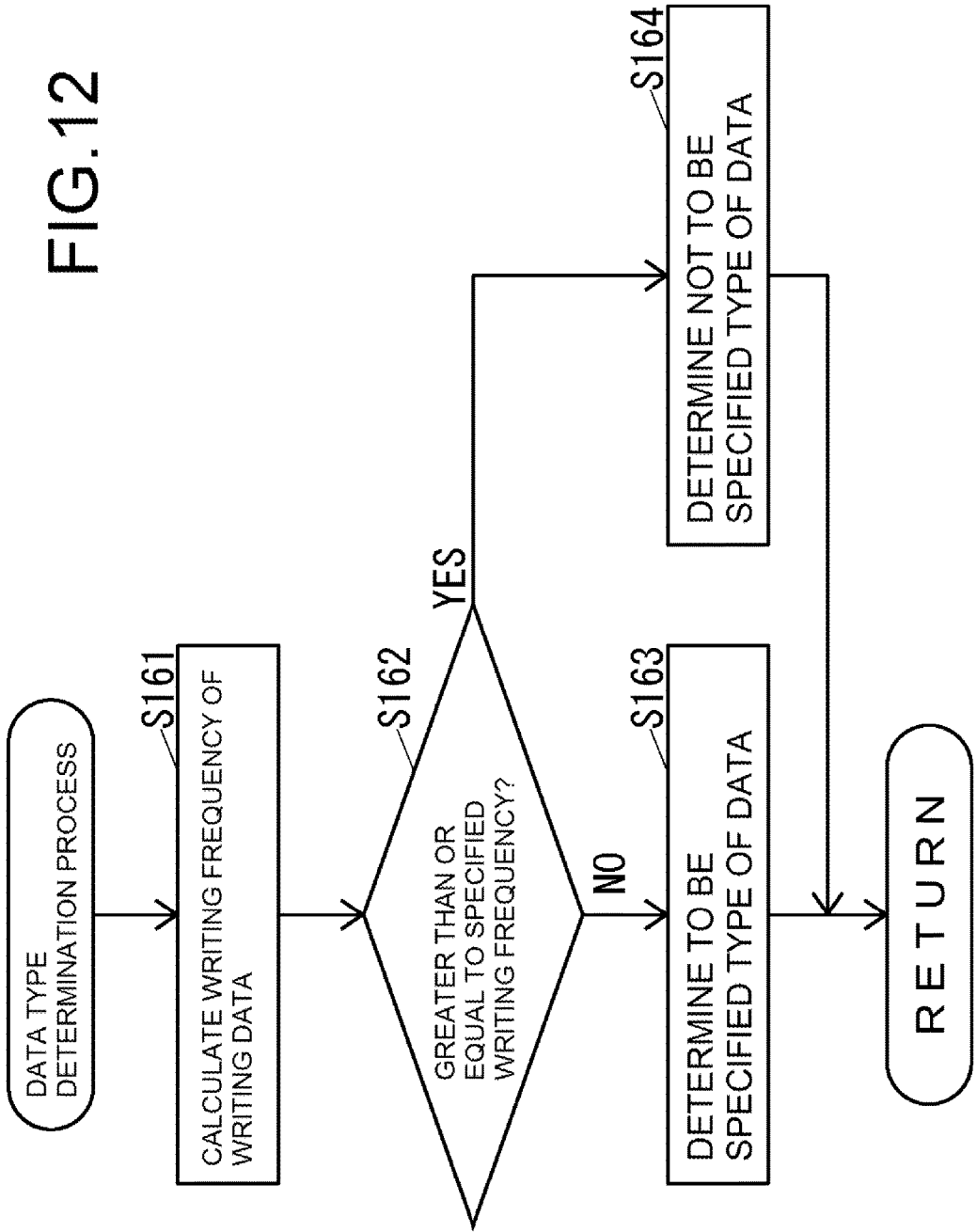
FIG. 12 illustrates another example, which is different from the examples illustrated in FIG. 10 and FIG. 11, of the data type determination process illustrated in FIG. 9.

As illustrated in FIG. 12, the data type determination part 17a calculates a writing frequency of the writing data based on the writing history information 30b (S161).

Next, the data type determination part 17a determines whether or not the writing frequency calculated at S161 is greater than or equal to a specified writing frequency (S162).

If the data type determination part 17a determines, at S162, that the writing frequency calculated at S161 is less than the specified writing frequency (S163), the data type determination part 17a determines that the writing data is the specified type of data and terminates the data type determination process illustrated in FIG. 12.

On the other hand, if the data type determination part 17a determines, at S162, that the writing frequency calculated at S161 is greater than or equal to the specified writing frequency, the data type determination part 17a determines that the writing data is not the specified type of data and terminates the data type determination process illustrated in FIG. 12 (S164).

The data type determination process illustrated in FIG. 9 may be embodied in a combination of either one of the aforementioned plural data type determination processes and the data type determination process illustrated in FIG. 12.

For example, the data type determination process illustrated in FIG. 9 may be embodied in a combination of the data type determination process illustrated in FIG. 10 and the data type determination process illustrated in FIG. 12. In a case where the data type determination process illustrated in FIG. 9 is embodied in a combination of the data type determination process illustrated in FIG. 10 and the data type determination process illustrated in FIG. 12, if the reading frequency of the writing data is greater than or equal to the specified reading frequency and concurrently if the writing frequency of the writing data is greater than or equal to the specified writing frequency, the data type determination part 17a is allowed, according to a predefinition, to determine that the writing data is the specified type of data and otherwise the writing data is not the specified type of data. In a case where the data type determination process illustrated in FIG. 9 is embodied in a combination of the data type determination process illustrated in FIG. 10 and the data type determination process illustrated in FIG. 12, if the reading frequency of the writing data is greater than or equal to the specified reading frequency and concurrently if the writing frequency of the writing data is greater than or equal to the specified writing frequency, the data type determination part 17a is allowed, according to a newly defined condition as indicated in FIG. 13, to determine that the writing data is the specified type of data and otherwise the writing data is not the specified type of data.

Figure 13:
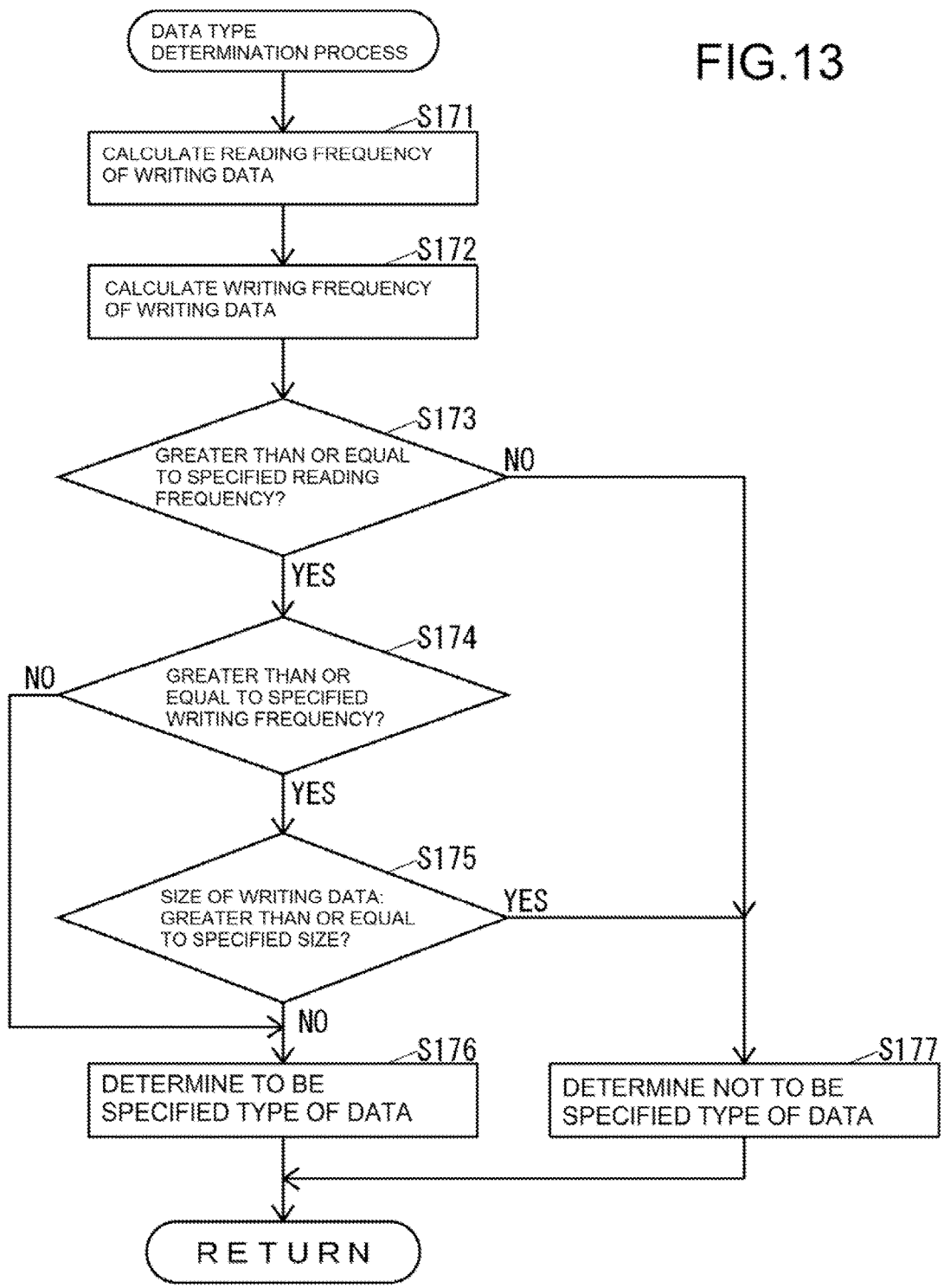
FIG. 13 illustrates another example, which is different from the examples illustrated in FIG. 10, FIG. 11 and FIG. 12, of the data type determination process illustrated in FIG. 9.

As illustrated in FIG. 13, the data type determination part 17a calculates a reading frequency of the writing data based on the reading history information 30a (S171).

Next, the data type determination part 17a calculates a writing frequency of the writing data based on the writing history information 30b (S172).

Next, the data type determination part 17a determines whether or not the reading frequency calculated at S171 is greater than or equal to the specified reading frequency (S173).

If the data type determination part 17a determines, at S173, that the reading frequency calculated at S171 is greater than or equal to the specified reading frequency, the data type determination part 17a determines whether or not the writing frequency calculated at S172 is greater than or equal to the specified writing frequency (S174).

If the data type determination part 17a determines, at S174, that the writing frequency calculated at S172 is greater than or equal to the specified writing frequency, the data type determination part 17a determines whether or not the size of the writing data is greater than or equal to a specified size (S175).

If the data type determination part 17a determines, at S174, that the writing frequency is less than the specified writing frequency or determines, at S175, that size of the writing data is less than the specified size, the data type determination part 17a determines that the writing data is the specified type of data (S176) and then terminates the data type determination process illustrated in FIG. 13.

If the data type determination part 17a determines, at S173, that the reading frequency of the writing data is less than the specified reading frequency or determines, at S175, that the size of the writing data is greater than or equal to the specified size, the data type determination part 17a determines that the writing data is not the specified type of data (S177) and terminates the data type determination process illustrated in FIG. 13.

As illustrated in FIG. 9, after the execution of the data type determination process at S131, the data type determination part 17a determined whether or not the type of data that is determined in the data type determination process at S131 is the specified type of data (S132).

If the writing control part 17b determines, at S132, that the type of data that is determined in the data type determination process is the specified type of data, the data type determination part 17a executes an SSD writing determination process for determining whether or not the writing data is to be written to the SSD 20 (S133).

Figure 14:
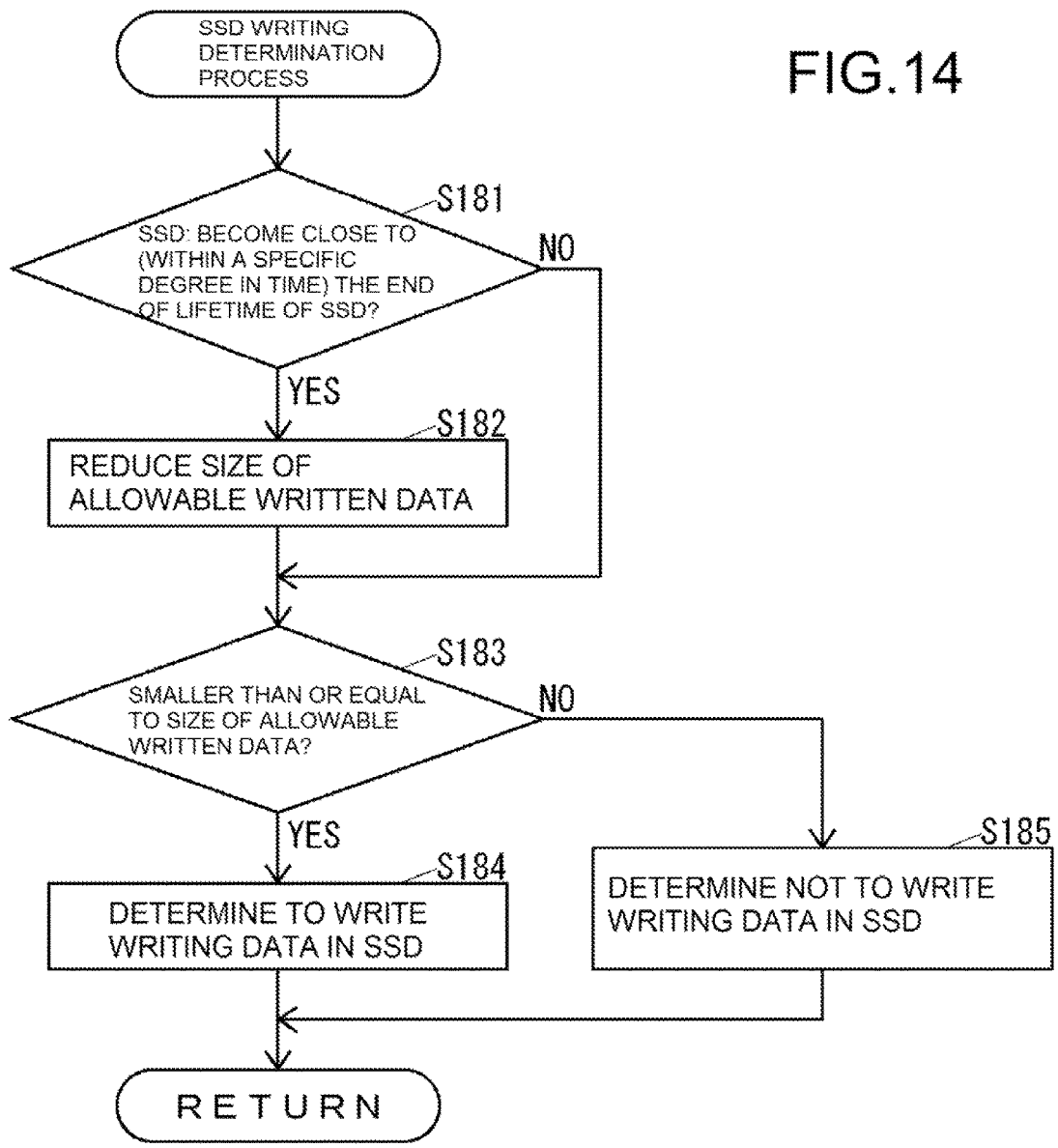
FIG. 14 illustrates an example of an SSD writing determination process illustrated in FIG. 9.

FIG. 14 illustrates an example of the SSD writing determination process illustrated in FIG. 9.

As illustrated in FIG. 14, the writing control part 17b determines whether or not the SSD 20 becomes close to (within a specific degree in time) the end of a lifetime of the SSD 20 (S181). Here, when counting the Erase (erasing frequency) of the SSD 20 is close to the upper limit value of the erasing frequency in excess of a specified degree, the writing control part 17b determines that the SSD 20 becomes close to (within the specific degree in time) the end of a lifetime of the SSD 20.

If the writing control part 17b determines, at S181, that the SSD 20 becomes close to (within the specific degree in time) the end of the lifetime of the SSD 20, the writing part 17b reduces the upper limit of unit size of data that is allowed to be written to the SSD 20 as compared to the normal.

If the writing control part 17b determines, at S181, that the SSD 20 does not be close to (within the specific degree in time) the end of the lifetime of the SSD 20 or if the writing control part 17b terminates the process of S182, the writing control part 17b determines whether or not the size of the writing data is smaller than or equal to the upper limit of the unit size of the data allowed to be written to the SSD 20 (S183). It is to be noted that the writing control part 17b determines, at S181, that the SSD 20 does not be close to (within the specific degree in time) the end of the lifetime of the SSD 20, the normally used upper limit is employed for the determination at S183 as the upper limit of the unit size of the data allowed to be written to the SSD 20.

If the writing control part 17b determines, at S183, that the size of the writing data is smaller than or equal to the upper limit of the unit size of the data allowed to be written to the SSD 20, the writing control part 17b determines to write the writing data to the SSD 20 (S184) and terminates the SSD writing determination process illustrated in FIG. 14.

If the writing control part 17b determines, at S183, that the size of the writing data is greater than the upper limit of the unit size of the data allowed to be written to the SSD 20, the writing control part 17b determines not to write the writing data to the SSD 20 (S185) and terminates the SSD writing determination process illustrated in FIG. 14.

As an example of the SSD writing determination process illustrated in FIG. 9, any process may be employed other than the SSD writing determination process illustrated in FIG. 14. For example, the SSD writing determination process illustrated in FIG. 9 may be embodied in an SSD writing determination process illustrated in FIG. 15.

Figure 15:
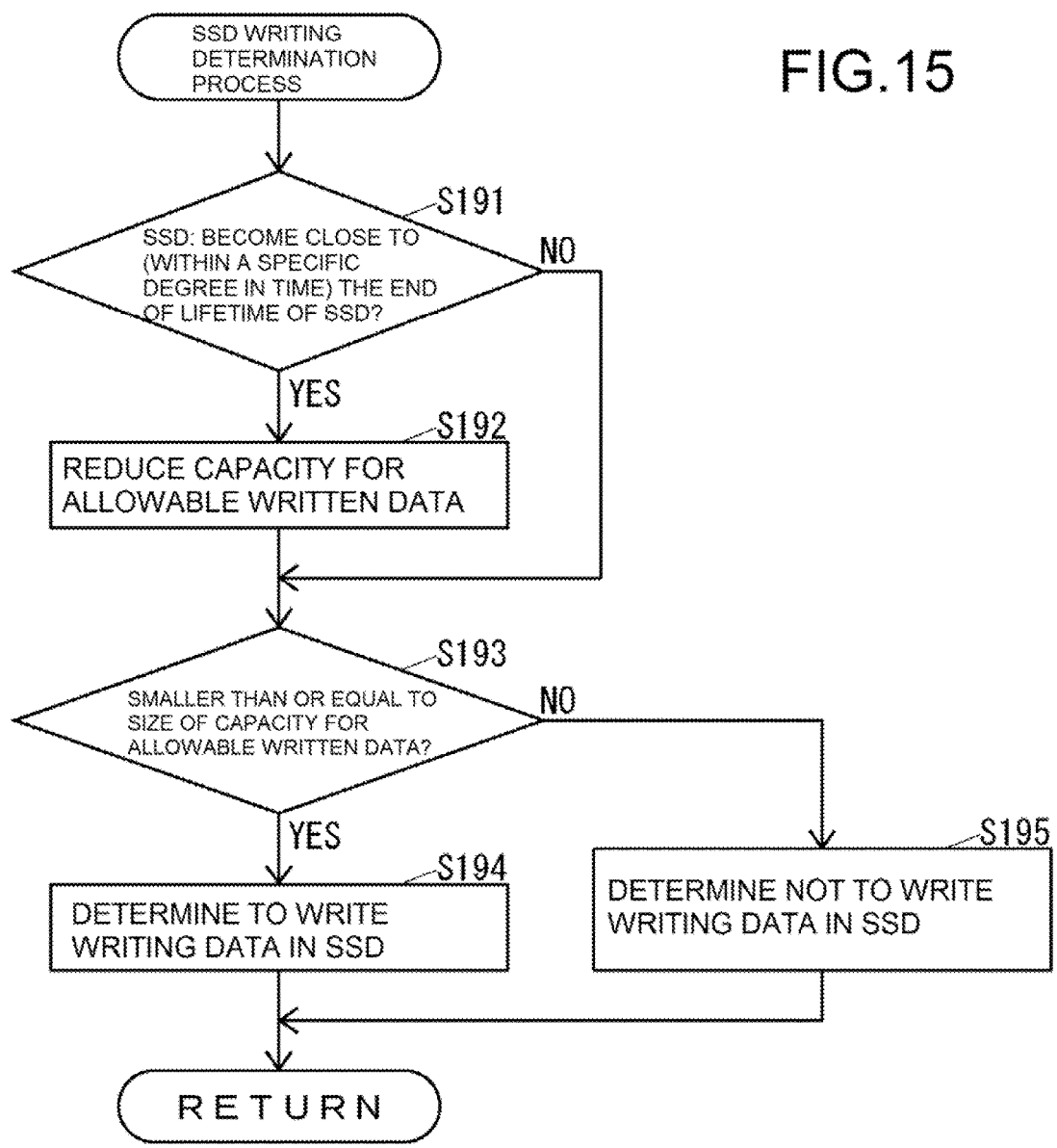
FIG. 15 illustrates another example, which is different from the example illustrated in FIG. 14, of the SSD writing determination process illustrated in FIG. 9.

As illustrated in FIG. 15, similar to the execution of the step of S181 (refer to FIG. 14), the writing control part 17b determines whether or not the SSD 20 becomes close to (within the specific degree in time) the end of a lifetime of the SSD 20 (S191).

If the writing control part 17b determines, at S191, that the SSD 20 becomes close to (within the specific degree in time) the end of the lifetime of the SSD 20, the writing control part 17b reduces the capacity of a portion of the SSD 20 to which data is allowed to write than usual (S192). For example, in a case where the capacity of a portion of the SSD 20 to which data is allowed to be written is usually 10 GByte, the writing control part 17b reduces the capacity of the portion of the SSD 20 to which data is allowed to write to 5 Gbyte.

If the writing control part 17b determines, at S191, that the SSD 20 does not be close to (within the specific degree in time) the end of the lifetime of the SSD 20, or terminates the execution of S192, the writing control part 17b determines whether or not the capacity of the already data written portion of the SSD 20 is smaller than or equal to a capacity of a portion of the SSD 20 to which data is allowed to write (S193). It is to be noted that if the writing control part 17b determines, at S191, that the SSD 20 does not be close to (within the specific degree in time) the end of the lifetime of the SSD 20, the writing control part 17b uses the usually data written capacity as the capacity of the portion of the SSD 20 to which data is allowed to write for the determination at S193.

If the writing control part 17b determines, at S193, that the capacity of the already-data-written portion of the SSD 20 is smaller than or equal to the capacity of the portion of the SSD 20 to which data is allowed to write, the writing control part 17b determines that the writing data is to be written to the SSD 20 (S194) and terminates the SSD writing determination process illustrated in FIG. 15.

If the writing control part 17b determines, at S193, that the capacity of the already data written portion of the SSD 20 is greater than the capacity of the portion of the SSD 20 to which data is allowed to write, the writing control part 17b determines that the writing data is not to be written to the SSD 20 (S195) and terminates the SSD writing determination process illustrated in FIG. 15.

The SSD writing determination process illustrated in FIG. 9 may be embodied in a combination of the SSD writing determination process illustrated in FIG. 14 and the SSD writing determination process illustrated in FIG. 15. More specifically, the writing control part 17b may determine that the writing data is to be written to the SSD 20 if both cases are fulfilled, one of the cases being that the size of the writing data is smaller than or equal to the upper limit of the unit size of the data allowed to be written to the SSD 20d, the other of the case being that the capacity of the already data written portion of the SSD 20 is smaller than or equal to the capacity of the portion of the SSD 20 to which data is allowed to write.

The SSD writing determination process illustrated in FIG. 9 may be embodied in any process other than the aforementioned plural SSD writing determination processes. For example, the SSD writing determination process illustrated in FIG. 9 may be embodied in an SSD writing determination process illustrated in FIG. 16.

Figure 16:
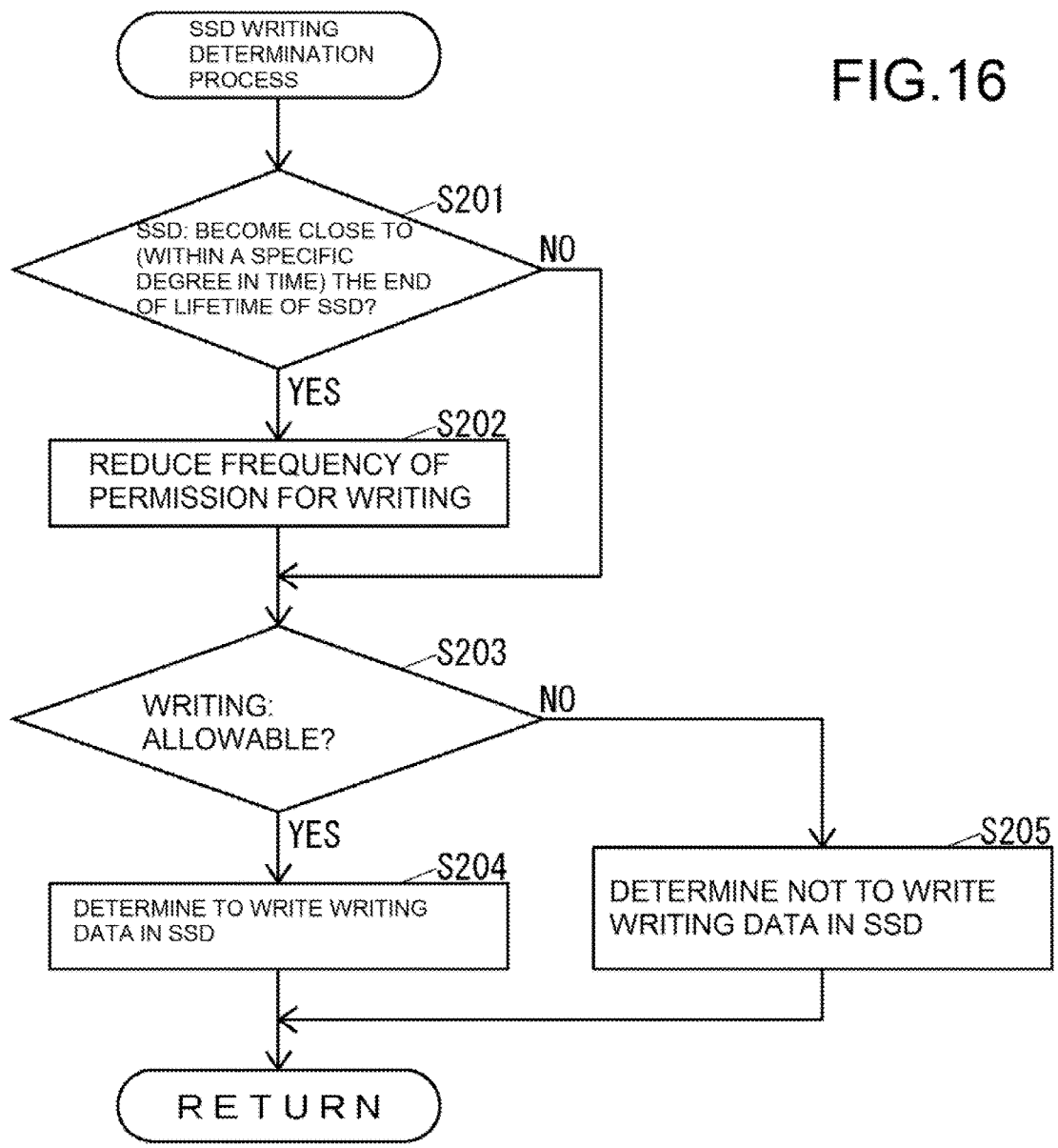
FIG. 16 illustrates another example, which is different from the examples illustrated in FIG. 14 and FIG. 15, of the SSD writing determination process illustrated in FIG. 9.

As illustrated in FIG. 16, similar to the execution of the process of S181 (refer to FIG. 14), the writing control part 17b determines whether or not that the SSD 20 becomes close to (within the specific degree in time) the end of the lifetime of the SSD 20 (S201).

If the writing control part 17b determines, at S201, that the SSD 20 becomes close to (within the specific degree in time) the end of the lifetime of the SSD 20, the writing control part 17b reduces the frequency of allowance for writing data to the SSD 20 less than the usually allowed frequency (202).

If the writing control part 17b determines, at S201, that the SSD 20 does not be close to (within the specific degree in time) the end of the lifetime of the SSD 20, or if the writing control terminates the execution of S202, the writing control part 17b determines whether or not the writing data is allowed to be written to the SSD 20 based on the allowance frequency for writing data to the SSD 20 (S203). It is to be noted that the writing control part 17b determines, at S201, that the SSD 20 does not be close to (within the specific degree in time) the end of the lifetime of the SSD 20, as the allowance frequency for writing data to the SSD 20, the usual allowance frequency is used in the determination at S203.

If the writing control part 17b determines, at S203, that the writing data is allowed to be written to the SSD 20, the writing control part 17b determines that the writing data is to be written to the SSD 20 (S204) and terminates the SSD writing determination process illustrated in FIG. 16.

If the writing control part 17b determines, at S203, that the writing data is not allowed to be written to the SSD 20, the writing control part 17b determines that the writing data is not to be written to the SSD 20 (S205) and terminates the SSD writing determination process illustrated in FIG. 16.

The SSD writing determination process illustrated in FIG. 9 may be embodied in any combination of the aforementioned plural the SSD writing determination processes. For example, the writing control part 17b may determine that the writing data is to be written to the SSD, if all cases are fulfilled, one of the cases being that the size of the writing data is smaller than or equal to the upper limit of the unit size of the data allowed to be written to the SSD 20, another of the case being that the capacity of the already data written portion of the SSD 20 is smaller than or equal to the capacity of the portion of the SSD 20 to which data is allowed to write, and the other being that writing the writing data to the SSD 20 is allowed based on the allowance frequency for writing data to SSD 20.

As illustrated in FIG. 9, after the SSD writing determination process at S133, the writing control part 17b determines whether or not the writing data being to be written to the SSD 20 is determined during the SSD writing determination process at S133 (S134).

If the writing control part 17*b* determines, at S134, that writing the writing data is determined to be written to the SSD 20 by the SSD writing determination process, the writing control part 17*b* writes the writing data to the HDD 30 and also to the SSD 20 as a backup copy (S135), and then add the identification information of the writing data to the backup information 30*d* (S136).

It the writing control part 17*b* determines, at S132, that the data type that is determined by the data type determination process is not the specified type of data, or determines, at S134, that the writing data that is determined by the SSD writing determination process is not to be written to the SSD 20, the writing control part 17*b* writes the writing data to only the HDD 30 (S137). Then, if the identification information of the writing data is included in the backup information 30*d*, the writing control part 17*b* deletes data whose identification information is identical with the identification information of the writing data from the SSD 20 (S138). Thereafter, the writing control part 17*b* deletes the identification information of the writing data from the backup information 30*d*.

If the writing control part 17*b* completes the process of S136 or the process of S139, the writing control part 17*b* updates the writing history information 30*b* in relation to the writing data (S140) and terminates the processes illustrated in FIG. 9.

It is to be noted that the MFP 10 may omit the process of S133 and S134 in the processes illustrated in FIG. 9. More specifically, if the writing control part 17*b* determines, at S132, that the data type that is determined by the data type determination part is the specified type of data, the writing control part 17*b* may execute always the process of S135.

Next, a description is made as to how the MFP 10 on which the HDD 30 is mounted as illustrated in FIG. 1 in order to read data.

FIG. 17 illustrates steps of a data reading operation of the MFP 10 on which the HDD 30 is mounted.

As illustrated in FIG. 17, the data type determination part 17*a* determines whether or not data to be read (hereinafter which will be referred to as "reading data") has been written to both the SDD 20 and the HDD 30 based on the backup information 30*d* (S211). Here, if the identification information of the reading data is included in the backup information 30*d*, the data type determination part 17*a* determines that the reading data has been written to both the SDD 20 and the HDD 30. On the other hand, if the identification information of the reading data is not included in the backup information 30*d*, the data type determination part 17*a* determines that the reading data has not been written to both the SDD 20 and the HDD 30.

If the reading data is determined to have been written to both the SDD 20 and the HDD 30 at S211, the reading control part 17*c* reads the reading data from the SSD 20 (S212).

On the other hand, the reading data is determined not to have been written to both the SDD 20 and the HDD 30 at S211, the reading control part 17*c* reads the reading data from the HDD 30 (S213).

After the step of S212 or S213, the reading control part 17*c* updates the reading history information 30*a* in relation to the reading data (S214) and then terminates the process illustrated in FIG. 17.

As described above, the MFP 10 writes the specific type of data to both the HDD 30 and the SSD 20 (S135) for generating backup copies. Thus, even if either or both of the SSD 20 and the HDD 30 are out of order due to various factors including, for example, their elapsed years of use and use environments, the whole MFP 10 is capable of suppressing a malfunction by which reading a specified type of data is made disabled.

Here, the SSD 20, that is a type of semiconductor storage device, comes to its life end depending on its data writing number of times, resulting in that errors may occur easily. However, the MFP 10 writes data, other than the specified type of data, to only the SSD 20 that is one of the SSD 20 and the HDD 30 (S137) in order to suppress an early reaching of the end of the lifetime of the HDD 20, which makes it possible to maintain the backup performance of the specified type of data for a long duration of time.

The MFP 10 writes only the specified type of data to both HDD 30 and the SSD 20 and therefore, for example, setting important data as the specified type of data allows the SDD 20 of a small storage capacity to provide an efficient effect in data backup.

According to this configuration, the electronic device of the present disclosure writes only the specified type of data to both the hard disk drive and the semiconductor storage device for data backup and writes data, other than the specified type of data, to only the hard disk drive that is one of the semiconductor storage device and the hard disk drive in order to suppress an early reaching of the end of lifetime of the semiconductor storage device, resulting in making it possible to maintain the backup performance of the specified type of data for a long duration of time.

The possibility of reading frequency of important information is high. The MFP 10 writes data of high reading frequency writes to both the HDD 30 and the SSD 20 (YES at S142, S143, YES at S132, and S135), which makes it possible to maintain the back performance of the specified type of data for a long duration of time. Examples of important information include, for example, data of form of slip to be printed by the printer 13.

In such a way, in the electronic device of the present disclosure, the data type determination part may determine that data whose reading frequency is larger than or equal to the specified reading frequency is the specified type of data.

The possibility of reading frequency of important information is high. The electronic device of the present disclosure writes data of high reading frequency to both the hard disk drive and a semiconductor storage device, which makes it possible to improve the backup performance of the important data.

The SSD 20 has a tendency to deteriorate in performance as its writing number of times increases. The MFP 10 is configured not to write data of high reading frequency to the SSD 20 (YES at S162, S164, NO at S132, and S137), thereby preventing the performance of the SSD 20 from being degraded. Thus, the MFP 10 is capable of maintaining the backup performance of the specified type of data for a long duration of time.

In such a way, in the electronic device of the present disclosure, the data type determination part may determine that data whose writing frequency is larger than or equal to the specified writing frequency is not the specified type of data.

The semiconductor storage device has a tendency to deteriorate in performance as its writing number of times increases. The electronic device of the present disclosure does not write data of high reading frequency to the semiconductor storage device, thereby preventing the performance of the semiconductor storage device from being degraded. Thus, the electronic device of the present disclosure is capable of maintaining the backup performance of the specified type of data for a long duration of time.

The MFP 10, which writes data to both the SSD 20 and the HDD 30, requires a longer time for data writing, when compared to writing data to only the HDD 30, by a time required for writing the data to the SSD 20. The MFP 10 does not write the data of high writing frequency to only the HDD 30 without writing the same to both the SSD 20 and the HDD 30. Thus, it is possible for the MFP 10 to reduce a time required for writing data of high writing frequency, when compared to writing the same to both the SSD 20 and the HDD 30. Therefore, the MFP 10 is capable of improving data writing efficiency.

The SSD 20 has a tendency to deteriorate in performance as its writing number of times increases. For this reason, as described above, the MFP 10 make it possible to prevent the performance of the SSD 20 from being degraded by not writing the data of high writing frequency to the SSD 20. Here, though the SSD 20 has limitation in the number of rewriting for the cells, the smaller the size of data to be written, the smaller the number of cells that are rewritten by single data writing, thereby suppressing an early reaching of the end of lifetime of the SSD 20. Thus, even if the data is of high writing frequency (YES at S174), if the size of the data is small (NO at S175) and concurrently if the data is of high reading frequency, that is, the data is of high possibility of being important (YES at S173), the MFP 10 takes backup copies by writing the data to not only the HDD 30, but also to the SSD 20 (S176, YES at S132, and S135). It is to be noted that the writing speed to physically continuous regions of the HDD 30 is higher than that to physically discontinuous regions of the HDD 30. More specifically, in a case where data that is apt to be written to the physically continuous regions of the HDD 30, that is, in a case where data of a large size is to be written if this case is compared to a case where data of a small size is written, for the HDD 30, the writing speed per unit size of data is higher. In addition, though the SSD 20 has limitation in the number of rewriting for the cells, the larger the size of data to be written, the larger the number of cells that are rewritten by single data writing, resulting in an early reaching of the end of lifetime of the SSD 20. The MFP 10 writes the data to the HDD 30 that is one of the HDD 30 and the SSD 20 if both the data reading data frequency and the writing data frequency are high (YES at S173 and YES at S174) and concurrently if the size of the data is large (YES at S175), which results in an early termination of data writing and suppression of the performance of the SSD 20.

In such a way, in the electronic device of the present disclosure, the data type determination part is allowed to determine that the data whose reading frequency is greater than or equal to the specified reading frequency and whose writing frequency is greater than or equal to the specified writing frequency is the specified type of data if the size of the data is less than the specified size and is not the specified type of data if the size of the data is greater than or equal to the specified size.

The semiconductor storage device has a tendency to deteriorate in performance as its writing number of times increases. For this reason, the electronic device of the present disclosure makes it possible to prevent the performance of the semiconductor storage device from being degraded by not writing the data of high writing frequency to the semiconductor storage device. Here, though the semiconductor storage device has limitation in the number of rewriting for the cells, the smaller the size of data to be written, the smaller the number of cells that are rewritten by single data writing, thereby suppressing an early reaching of the end of lifetime of the semiconductor storage device. Thus, even if the data is of high writing frequency, if the size of the data is small and concurrently if the data is of high reading frequency, that is, the data is of high possibility of being important, the electronic device of the present disclosure takes backup copies by writing the data to not only the hard disk drive, but also to the semiconductor storage device. It is to be noted that the writing speed to physically continuous regions of the hard disk drive is higher than that to discontinuous regions of the hard disk drive. More specifically, in a case where data that is apt to be written to the physically continuous regions of the hard disk drive, that is, in a case where data of a large size is to be written, if this case is compared to a case where data of a small size is written, for the hard disk drive, the writing speed per unit size of data is higher. In a case where both the data reading frequency and the data writing frequency are high, if the size of data is large, the electronic device of the present disclosure writes the data to the hard disk drive, one of the hard disk drive and the semiconductor storage device, which makes it possible to attain an earlier completion of the data writing.

The data transmitted from a specific transmission source may be highly likely important data. The MFP 10 writes the data transmitted from the specific transmission source to both the HDD 30 and the SDD 20 (YES at S151, S152, YES at S132, and S135), which makes it possible to provide an improved performance in taking important data backup copy.

In such away, in the electronic device of the present disclosure, the data type determination part may determine that the data whose transmission source is the specific transmission source is the specified type of data.

The data transmitted from a specific transmission source may be highly likely important data. The electronic device of the present disclosure writes the data transmitted from the specified transmission source to both the hard disk drive and the semiconductor storage, which makes it possible to provide an improved performance in taking important data backup copy.

Sometimes, the data that is stored to a specific storage designation of the HDD 30 may be highly likely important data. The MFP 10 writes the data to be written to the specific storage designation of the HDD 30 to both the HDD 30 and the SSD 20 (YES at S151, S152, YES at S132, and S135), which makes it possible to provide an improved performance in taking important data backup copy.

In such a way, in the electronic device of the present disclosure, the data type determination part may determine that the data whose specified storage destination is a storage designation of the hard disk drive is the specified kind of data.

Sometimes, the data that is stored to a specific storage designation of the hard disk drive may be highly likely important data. The electronic device of the present disclosure writes the data to be written to the specific storage designation of the hard disk drive to both the hard disk drive and the semiconductor storage device, which makes it possible to provide an improved performance in taking important data backup copy.

The SSD 20 is higher than the HDD 30 in data reading speed. The MFP 10 writes the specified kind of data to both the HDD 30 and the SDD 20 (YES at S132 and S135), and read the data written to both the HDD 30 and the SDD 20 from the SSD 20 (YES at S211 and 212), which make it possible to read the specified kind of data at a high speed. In particular, in a case where the data whose high reading frequency is high is determined as the specified kind of data (YES at S142 and S143), the MFP 10 is capable of reading, at a high speed, the data whose reading frequency is high effectively. Here, important data is high possibility of being high reading frequency. Thus, if the data of high reading frequency is treated as the specified kind of data, the MFP 10 has a high capability of reading important data at a high speed.

In such a way, the electronic device of the present disclosure includes the reading control part for controlling data reading, which may read the data stored in both the hard disk drive and the semiconductor storage device from the semiconductor storage device.

The semiconductor storage device is higher than the hard disk drive in data reading speed. The electronic device of the present disclosure writes the specified type of data to both the hard disk drive and the semiconductor storage device, and read the data written to both the hard disk drive and the semiconductor storage device from the semiconductor storage device, which make it possible to read the specified type of data at a high speed.

If the HDD 30, as an option, is mounted on the MFP 10 in an additional manner, the MFP 10 writes the data that is read from the SSD 20 to the HDD 30 (S123), which will provide an easy initiation of taking data backup copy.

In such a way, in the electronic device of the present disclosure, the hard disk drive is a device capable of being mounted, as an option, in an additional manner, the electronic device includes the upon-HDD-mounting data process part that processes data when the hard disk drive is mounted in an additional manner, and the upon-HDD-mounting data process part may cause the writing control part to write the data that is read from the semiconductor storage device by the reading control part to the hard disk drive.

According to this configuration, if the hard disk drive, as an option, is mounted on the electronic device of the present disclosure in an additional manner, the electronic device of the present disclosure writes the data that is read from the semiconductor device to the hard disk drive, which will provide an easy initiation of taking data backup copy.

It is to be noted that in the present exemplary embodiment the HDD 30 is prepared as an optionally provided device and therefore the HDD 30 may be mounted on the MFP 10 in an additional manner. However, instead of being an optionally provided device, the HDD 30 may be standardly equipped on the MFP 10. If the HDD 30 is standardly equipped on the MFP 10, the SSD 20, similar to that in the present exemplary embodiment, may be standardly equipped on the MFP 10, or may be an optionally provided device capable of being mounted on the MFP 10 in an additional manner.

Though the SSD 20 has limitation in the number of rewriting for the cells, the larger the size of data to be written, the larger the number of cells that are rewritten by single data writing, resulting in an early reaching of the end of lifetime of the SSD 20. If the SSD 20 becomes close to (within a specific degree in time) the end of the lifetime of the SSD 20 (YES AT S181), the MFP 10 reduces the upper limit of unit size of data that is allowed to be written to the SSD 20 (S182). Thereby, the number of cells is suppressed when data is written to the SSD 20, which makes it possible to avoid an early reaching of the end of lifetime of the SSD 20. Thus, the MFP 10 is capable of maintaining the backup performance of the specified type of data for a long duration of time.

In such a way, in the electronic device of the present disclosure, when the semiconductor storage device becomes close to (within a specific degree in time) the end of lifetime of the semiconductor storage device, the writing control part may reduce the upper limit of unit size of data that is allowed to be written to the semiconductor storage device as compared to when the semiconductor storage device does not be close to (within the specific degree in time) the end of lifetime of the semiconductor storage device.

Though the semiconductor storage device has a limitation in the number of rewriting for the cells, the larger the size of data to be written, the larger the number of cells that are rewritten by single data writing, resulting in an early reaching of the end of lifetime of the semiconductor storage device. If the semiconductor storage device becomes close to (within the specific degree in time) the end of lifetime of the semiconductor storage device, the electronic device of the present disclosure reduces the upper limit of unit size of data that is allowed to be written to the semiconductor storage device. Thereby, the number of cells to be rewritten is suppressed when data is written to the semiconductor storage device, which makes it possible to avoid an early reaching of the end of lifetime of the semiconductor storage device. Thus, the electronic device of the present disclosure is capable of maintaining the backup performance of the specified type of data for a long duration of time.

If the MFP 10 determines (YES at S191) that the SSD 20 becomes close to (within a specific degree in time) the end of lifetime of the SSD 20, the MFP 10 reduces the capacity of a portion of the SSD 20 to which data is allowed to write (S192). More specifically, reducing the number of data to be written to the SSD 20 suppresses the data writing to the SSD 20 (S195), which makes it possible to avoid an early reaching of the end of lifetime of the SSD 20. Thus, the MFP 10 is capable of maintaining the backup performance of the specified type of data for a long duration of time.

In such a way, in the electronic device of the present disclosure, the writing control part, when the semiconductor storage device becomes close to, within a specific degree in time, the end of a lifetime of the semiconductor storage device, may reduce a capacity of an allowable part to write data in the semiconductor storage device as compared to when the semiconductor storage device does not be close to, within the specific degree in time, the end of the lifetime of the semiconductor storage device.

According to this configuration, the electronic device of the present disclosure, when the semiconductor storage device becomes close to, within a specific degree in time, the end of a lifetime of the semiconductor storage device, may reduce a capacity of an allowable part to write data in the semiconductor storage device, reduces the capacity of a portion of the semiconductor storage device to which data is allowed to write. More specifically, reducing the number of data to be written to the semiconductor storage device suppresses the data writing to the semiconductor storage device, which makes it possible to avoid an early reaching of the end of lifetime of the semiconductor storage device. Thus, the electronic device of the present disclosure is capable of maintaining the backup performance of the specified type of data for a long duration of time.

If the MFP 10 determines that the SSD 20 becomes close to (within the specific degree in time) the end of lifetime of the SSD 20 (YES at S201), the MFP 10 reduces the frequency of allowance for writing data to the SSD 20, (S202), that suppresses the data writing to the SSD 20, thereby avoiding an early reaching of the end of lifetime of the semiconductor storage device. Thus, the MFP 10 is capable of maintaining the backup performance of the specified type of data for a long duration of time.

In such a way, in the electronic device of the present invention, in a case where the semiconductor storage device becomes close to (within the specific degree in time) the end of lifetime of the semiconductor storage device, the writing control part may reduce the frequency of allowance for writing data to the semiconductor storage device, as compared to a case where the semiconductor storage device does not be close to (within the specific degree in time) the end of lifetime of the semiconductor storage device. Thus, the electronic device of the present disclosure is capable of maintaining the backup performance of the specified type of data for a long duration of time.

According to this configuration, the electronic device of the present disclosure makes it possible, when the semiconductor storage device becomes close to (within the specific degree in time) the end of lifetime of the semiconductor storage device, to reduce the frequency of allowance for writing data to the semiconductor storage device, that suppresses the data writing to the semiconductor storage device, thereby avoiding an early reaching of the end of lifetime of the semiconductor storage device. Thus, the semiconductor storage device is capable of maintaining the backup performance of the specified type of data for a long duration of time.

In the present exemplary embodiment, the MFP 10 causes the HDD 30 to store the reading history information 30*a*, the writing history information 30*b*, the specified type determination condition information 30*c*, and the backup information 30*d*. However, the MFP 10 may allow a storage device such as the RAM of the control part 17, the SSD 20 or the like, other than the HDD 30, to store at least one of the reading history information, the writing history information, the specified type determination condition information, and the backup information. In addition, even if the MFP 10 stores the reading history information, the writing history information, the specified type determination condition information, and the backup information in the HDD 30, the MFP 10 may cause a storage device, other than the HDD 30, to store at least one of the reading history information, the writing history information, the specified type determination condition information, and the backup information before the HDD 30 is mounted on the MFP 10 in an additional manner in order to move storing data to the HDD 30 after the HDD 30 is mounted on the MFP 10. In particular, the MFP 10 may update the reading history information and the writing history information based on use result data while the HDD 30 is not mounted on the MFP 10 in an additional manner, which makes it possible, after mounting the HDD 30 on the MFP 10, for the MFP 10 to initiate a suitable operation in a prompt manner that is based on the updated reading history information and the writing history information.

In a typical electronic device, if a determination algorism determines a semiconductor storage device, which is one of a Hard disk drive and the semiconductor storage device, as a data storage destination, increasing the data writing frequency causes the semiconductor storage device to reach its early end of life, which raises a problem of an early degradation the backup performance of important data.

In light of the aforementioned circumstances, an object of the present disclosure is to provide an electronic device and a data access control method both of which are capable of maintaining the backup performance of the specified type of data for a long duration of time.

The electronic device and the data access control method, according to the present disclosure, both of which are capable of maintaining the backup performance of the specified type of data for a long duration of time.

The electronic device of the present disclosure is in the form of the MFP in the present exemplary embodiment, however, image forming devices, other than the MFP, are available that include, for example, a printer dedicated device, a copy dedicated device, a facsimile dedicated device, and a scanner dedicated device, or electronic devices other than the image forming device that include for example, PCs (personal computers).

What is claimed is:

1. An electronic device, comprising:
a hard disk drive;
a semiconductor storage device;
a data type determination part that determines whether or not data meets a specified condition, wherein the specified condition comprises the data having a reading frequency equal to or higher than a specific reading frequency, and in addition,
(i) the data having a writing frequency less than a specific writing frequency, or
(ii) a) the data having a writing frequency equal to or higher than the specific writing frequency and, additionally, b) the data is smaller than a specific size,
the data type determination part determining whether (i) is true and determining whether (ii) is true when (i) is not true; and
a writing control part that controls writing of the data and determines whether the semiconductor storage device is within a threshold amount of time to the end of the lifetime of the semiconductor storage device,
the writing control part writing the data, when the data meets the specified condition, to both the hard disk drive and the semiconductor storage device,
when the data does not meet the specified condition, the writing control part writing the data, to the hard disk drive and not the semiconductor storage device and, if the data written to the hard disk has identification information identical to identification information of data stored in the semiconductor storage device, the writing control part deleting the data stored in the semiconductor storage device having the identical identification information, and
in response to the determination that the semiconductor storage device is within the threshold amount of time to the end of the lifetime of the semiconductor storage, the writing control part reducing the specific size.

2. The electronic device according to claim 1, wherein the specified condition further comprises the data having a size that is less than a specified size.

3. The electronic device according to claim 1, wherein the specified condition further comprises a transmission source of the data being a specific transmission source.

4. The electronic device according to claim 1, wherein the specified condition further comprises a storage destination of the hard disk drive being a specified storage destination of the hard disk drive.

5. The electronic device according to claim 1 further comprising a reading control part that controls a data reading, the reading control part reading, from the semiconductor storage device, the data stored in both the hard disk drive and the semiconductor storage device.

6. The electronic device according to claim 1, wherein the hard disk drive is an optional device that is capable of being mounted additionally to the electronic device, the electronic device includes an upon-HDD-mounting data process part that processes data when the hard disk drive is additionally mounted to the electronic device, and the upon-HDD-mounting data process part causes the writing control part to write, in the hard disk drive, the data that the reading control part reads from the semiconductor storage device.

7. The electronic device according to claim 1, wherein
the writing control part determines whether the semiconductor storage device is within a specified remaining lifetime, and
when the semiconductor storage device is within the specified remaining lifetime, the writing control part reduces an upper limit of data unit size that is allowed to be written to the semiconductor storage device as compared to when the semiconductor storage device is not within the specified remaining lifetime.

8. The electronic device according to claim 1, wherein
the writing control part determines whether the semiconductor storage device is within a specified remaining lifetime, and
when the semiconductor storage device is within the specified remaining lifetime, the writing control part reduces capacity of which a portion of the semiconductor storage device is allowed to be written as compared to when the semiconductor storage device is not within the specified remaining lifetime.

9. The electronic device according to claim 1, wherein
the writing control part determines whether the semiconductor storage device is within a specified remaining lifetime, and
when the semiconductor storage device is within the specified remaining lifetime, the writing control part reduces an allowed maximum frequency for writing data in the semiconductor storage device as compared to when the semiconductor storage device is not within the specified remaining lifetime.

10. A non-transitory computer-readable storage medium that stores a data access control program that is executable by a computer of an electronic device having a hard disk drive and a semiconductor storage device, the data access control program being configured, when being executed by the computer, to cause the computer to operate as
a data type determination part that determines whether or not data meets a specified condition, wherein the specified condition comprises the data having a reading frequency equal to or higher than a specific reading frequency, and in addition,
(i) the data having a writing frequency less than a specific writing frequency, or
(ii) a) the data having a writing frequency equal to or higher than the specific writing frequency and, additionally, b) the data is smaller than a specific size,
the data type determination part determining whether (i) is true and determining whether (ii) is true when (i) is not true; and
a writing control part that controls writing of the data and determines whether the semiconductor storage device is within a threshold amount of time to the end of the lifetime of the semiconductor storage device,
the writing control part writing the data, when the data meets the specified condition, to both the hard disk drive and the semiconductor storage device,
when the data does not meet the specified condition, the writing control part writing the data to the hard disk drive and not the semiconductor storage device and, if the data written to the hard disk has identification information identical to identification information of data stored in the semiconductor storage device, the writing control part deleting the data stored in the semiconductor storage device having the identical identification information, and
in response to the determination that the semiconductor storage device is within the threshold amount of time to the end of the lifetime of the semiconductor storage, the writing control part reducing the specific size.

* * * * *